(12) United States Patent
Matsuyoshi et al.

(10) Patent No.: US 6,980,831 B2
(45) Date of Patent: Dec. 27, 2005

(54) RADIO COMMUNICATION BASE STATE SYSTEM INCLUDING OPTICAL ADVANCED BASE STATION

(75) Inventors: Toshimitsu Matsuyoshi, Osaka (JP); Kaoru Ishida, Osaka (JP); Hisashi Adachi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 122 days.

(21) Appl. No.: 10/432,356

(22) PCT Filed: Dec. 6, 2001

(86) PCT No.: PCT/JP01/10659
§ 371 (c)(1),
(2), (4) Date: Sep. 26, 2003

(87) PCT Pub. No.: WO02/47049
PCT Pub. Date: Jun. 13, 2002

(65) Prior Publication Data
US 2004/0053644 A1 Mar. 18, 2004

(30) Foreign Application Priority Data
Dec. 8, 2000 (JP) ............................. 2000-374431

(51) Int. Cl.⁷ ............................. H04M 1/00; H03F 1/00
(52) U.S. Cl. ...................... 455/561; 359/10; 359/15; 359/16; 375/284; 375/285; 330/151
(58) Field of Search .............................. 455/296, 295, 455/114.1, 114.2, 114.3, 561, 278, 283, 500, 455/63.1, 67.13, 501, 68, 69, 302; 398/115, 398/116, 20, 23; 359/238, 248, 276, 278, 359/279, 299, 315; 330/151; 375/284, 285

(56) References Cited

U.S. PATENT DOCUMENTS

| | | | | |
|---|---|---|---|---|
| 4,276,514 A | * | 6/1981 | Huang | 330/149 |
| 5,615,034 A | * | 3/1997 | Hori | 398/158 |
| 5,675,613 A | * | 10/1997 | Uwano et al. | 375/346 |
| 6,122,083 A | * | 9/2000 | Ohta et al. | 398/1 |

(Continued)

FOREIGN PATENT DOCUMENTS

EP 0843380 * 11/1997 ............ H01Q 3/26

(Continued)

OTHER PUBLICATIONS

Ta-shing Chu and Michael J. Gans, IEEE Transactions on Vehicular Technology. vol. 40, No. 3, Aug. 1991, p. 76-88.*

(Continued)

Primary Examiner—Charles N. Appiah
Assistant Examiner—Olumide Ajibade-Akonai
(74) Attorney, Agent, or Firm—Greenblum & Bernstein, P.L.C.

(57) ABSTRACT

A wireless communication base station system of the present invention includes a wireless key base station, an optical forward base station, and an optical transmitter which connects the wireless key base station and the optical forward base station to each other. An optical signal modulated by a signal component and that modulated by a distortion component are transmitted from the wireless key base station to the optical forward base station. In the optical forward base station, these optical signals are converted to high-frequency electrical signals, and the high-frequency signal consisting of the signal component is amplified. Thereafter, the amplified signal is combined with the high-frequency signal consisting of the distortion component with their phases opposite to each other, so that the distortion component include in the amplified signal is removed.

28 Claims, 14 Drawing Sheets

U.S. PATENT DOCUMENTS

| | | | |
|---|---|---|---|
| 6,133,791 A * | 10/2000 | Horiguchi et al. | 330/149 |
| 6,313,702 B1 * | 11/2001 | Seino | 330/149 |
| 6,393,011 B1 * | 5/2002 | Kim | 370/342 |
| 6,424,214 B2 * | 7/2002 | Sera et al. | 330/149 |
| 6,873,860 B2 * | 3/2005 | Hildebrand et al. | 455/561 |

FOREIGN PATENT DOCUMENTS

| | | |
|---|---|---|
| JP | 6-98365 | 4/1994 |
| JP | 8-149552 | 6/1996 |
| JP | 10-22925 | 1/1998 |
| JP | 2000-152300 | 5/2000 |

OTHER PUBLICATIONS

Larry J. Greenstein, Noach Amltay, Ta-shing Chu, Leonard J. Crimini, Jr., Gerald J. Foschini, Micheal J. Gans, Chih-Lin I, A. J. Rustako Jr., Reinaldo A. Valenzuela, and Giovani Vannucci IEEE Communications Magazine. Dec., 1992, p. 599-606.*

Ta-Shing Chu and Micheal J. Gans, Fiber Optic Microcellular Radio, IEE Transactions on Vehicular Technology, vol. 40, No. 3, Aug. 1991, p. 599-606.*

Larry J. Greenstein, Noach Amltay, Ta-Shing Chu, Leonard Crimini, Jr., Gerald J. Foschini, Micheal J. Gans, Chih-Lin I, A. J. Rustako Jr., Reinaldo A. Valenzuela, and Giovani Vanucci, IEE Communications Magazine. Dec., 1992, pagea 76-88.*

English Language Abstract of JP 2000-152300, May 30, 2000.

English Language Abstract of JP 6-98365, Apr. 8, 19994.

English Language Abstract of JP 10-22925, Jan. 23, 1998.

English Language Abstract of JP 8-149552, Mar. 25, 1997.

* cited by examiner

RADIO COMMUNICATION BASE STATE SYSTEM INCLUDING OPTICAL ADVANCED BASE STATION

TECHNICAL FIELD

The present invention mainly relates to a wireless communication base station for a mobile telephone system or the like.

BACKGROUND ART

A transmitter of a key base station in a mobile communication system requires a power amplifier having high efficiency and high linearity. At the present, in order to amplify many signal channels at once, a power amplifier having high linearity is especially required. In order to increase the linearity of the power amplifier, in addition to employing a distortion compensator such as a feed forward system, it is necessary to reduce the distortion of an output of the power amplifier.

Meanwhile, an optical forward base station is placed as a base station in an area where communication traffic is heavy, for example an urban area in order to cover a communication area secondarily. This optical forward base station converts an optical signal transmitted from a key base station through an optical fiber to a high-frequency signal and transmits it. The optical forward base station is required to be small in size.

A wireless communication base station system including the optical forward base station will be described below with reference to FIG. 1 which is a block diagram of a wireless communication base station system including a conventional optical forward base station. As shown in FIG. 1, a wireless key base station 101 and an optical forward base station 102 are connected to each other through optical fibers 103, 104. The wireless key base station 101 consists of an input terminal 110 for a baseband signal, an output terminal 111 for a baseband signal, a modulator 112, a demodulator 113, an electrical to optical converter 114, and an optical to electrical converter 115. The optical forward base station 102 consists of an optical to electrical converter 120, an electrical to optical converter 121, a power amplifier 122, an antenna duplexer 123, an antenna 124, and a low-noise amplifier 125.

When a signal is transmitted from the wireless key base station 101 to the optical forward base station 102, if a baseband signal is input to the input terminal 110 for a baseband signal in the wireless key base station 101, the baseband signal is converted to a high-frequency signal by the modulator 112. The high-frequency signal is converted to an optical signal by the electrical to optical converter 114 and then transmitted to the optical forward base station 102 through the optical fiber 103. The transmitted optical signal is converted to a high-frequency signal by the optical to electrical converter 120 in the optical forward base station 102. The high-frequency signal is amplified by the power amplifier 122 to a desired output level. Thereafter, the amplified signal is radiated from the antenna 124 through the antenna duplexer 123. In this case, the power amplifier 122 is generally operated in a high-linearity area to make an adjacent-channel leakage power level equal to or lower than a predetermined value.

DISCLOSURE OF THE INVENTION (Technical Problem to be Solved by the Invention)

However, when the power amplifier 122 is operated in the high-linearity area, the power efficiency of the power amplifier 122 deteriorates, and the power consumption in the optical forward base station 102 increases as a whole. Thus, the optical forward base station 102 must be specially designed to radiate heat by increasing the area of a heat-radiation plate, by using a special device for heat radiation and so on. As a result, the optical forward base station 102 cannot be easily reduced in size. Meanwhile, employing a distortion compensation circuit in the optical forward base station 102 results in an increase in entire circuit scale of the optical forward base station 102.

It is an object of the present invention to reduce distortion of a signal transmitted from an optical forward base station and to provide a wireless communication base station system including a compact optical forward base station having high power efficiency.

(Solving Method Therefor)

The first wireless communication base station system according to the present invention includes a wireless key base station, an optical forward base station, and an optical transmitter which connects the wireless key base station and the optical forward base station to each other. The wireless key base station includes a modulator which modulates an input signal, a first distributor which distributes an input signal received from the modulator to two output signals, a first electrical to optical converter which converts a first output signal of the two output signals of the first distributor to an optical signal, a distortion extracter which extracts a distortion component from a signal obtained by amplifying a second output signal of the two output signals of the first distributor, and a second electrical to optical converter which converts an output signal of the distortion extracter to an optical signal. The optical forward base station includes a first optical to electrical converter which converts the optical signal transmitted from the first electrical to optical converter through the optical transmitter to an electrical signal, a second optical to electrical converter which converts the optical signal transmitted from the second electrical to optical converter through the optical transmitter to an electrical signal, and a distortion remover which generates an amplified signal from which the distortion component is removed by using the output electrical signal of the first optical to electrical converter and the output electrical signal of the second optical to electrical converter.

Preferably, in the first wireless communication base station system, the distortion remover includes a power amplifier which amplifies the output electrical signal of the first optical to electrical converter, and a first combiner which combines an output signal of the power amplifier and the output electrical signal of the second optical to electrical converter.

Preferably, the first wireless communication base station system further includes a delay compensator. The delay compensator is arranged between the first distributor and the first electrical to optical converter or between the first optical to electrical converter and the power amplifier.

Preferably, in the first wireless communication base station system, the distortion remover includes a first combiner which combines the output electrical signal of the first optical to electrical converter and the output electrical signal of the second optical to electrical converter, and a power amplifier which amplifies an output signal of the first combiner.

Preferably, the first wireless communication base station system further includes a delay compensator. The delay compensator is arranged between the first distributor and the first electrical to optical converter or between the first optical to electrical converter and the first combiner.

Preferably, in the first wireless communication base station system, the distortion extracter includes a first part which extracts a distortion signal from a signal obtained by amplifying an input signal, and a second part which adjusts the distortion signal to output the adjusted signal as the distortion component.

Preferably, the second part is placed in an output circuit of the second optical to electrical converter.

Preferably, in the first wireless communication base station system, the optical forward base station further includes a second distributor which distributes an input signal received from the distortion remover to two output signals, and a third electrical to optical converter which converts a third output signal of the two output signals of the second distributor to an optical signal. The wireless key base station further includes a third optical to electrical converter which converts the optical signal transmitted from the third electrical to optical converter through the optical transmitter to an electrical signal, and a detection and control device which detects the output electrical signal of the third optical to electrical converter to control the distortion extracter.

Preferably, in the first wireless communication base station system, the wireless key base station further includes a third distributor which distributes the first output signal of the first distributor to two output signals, and a second combiner which combines the output electrical signal of the third optical to electrical converter and a fourth output signal of the two output signals of the third distributor. The first electrical to optical converter converts a fifth output signal of the two output signals of the third distributor to an optical signal. The detection and control device detects an output signal of the second combiner to control the distortion extracter.

Preferably, in the first wireless communication base station system, the wireless key base station further includes a second combiner. The first distributor further includes a first output terminal and distributes the input signal received from the modulator to three output signals to output one of the three output signals to the first output terminal. The first output terminal is connected to the second combiner. The second combiner combines the output electrical signal of the third optical to electrical converter and the output signal from the first output terminal. The detection and control device detects an output signal of the second combiner to control the distortion extracter.

The second wireless communication base station system according to the present invention includes a wireless key base station, an optical forward base station, and an optical transmitter which connects the wireless key base station and the optical forward base station to each other. The wireless key base station includes a modulator which modulates an input signal, a first distributor which distributes an input signal received from the modulator to two output signals, a first electrical to optical converter which converts a first output signal of the two output signals of the first distributor to an optical signal, a first power amplifier which amplifies a second output signal of the two output signals of the first distributor, a first adjuster which adjusts an output signal of the first power amplifier, and a second electrical to optical converter which converts an output signal of the first adjuster to an optical signal. The optical forward base station includes a first optical to electrical converter which converts the optical signal transmitted from the first electrical to optical converter through the optical transmitter to an electrical signal, a second optical to electrical converter which converts the optical signal transmitted from the second electrical to optical converter through the optical transmitter to an electrical signal, a second distributor which distributes the electrical signal received from the first optical to electrical converter to two output signals, a first combiner which combines a third output signal of the two output signals of the second distributor and the output electrical signal of the second optical to electrical converter, a second adjuster which adjusts an output signal of the first combiner to output the adjusted signal as a distortion component, and a distortion remover which generates an amplified signal from which the distortion component is removed by using a fourth output signal of the two output signals of the second distributor and an output signal of the second adjuster.

Preferably, in the second wireless communication base station system, the distortion remover includes a second power amplifier which amplifies the fourth output signal of the second distributor, and a second combiner which combines an output signal of the second power amplifier and the output signal of the second adjuster.

Preferably, in the second wireless communication base station system, the distortion remover includes a second combiner which combines the fourth output signal of the second distributor and the output signal of the second adjuster, and a second power amplifier which amplifies an output signal of the second combiner.

Preferably, in the second wireless communication base station system, the optical forward base station further includes a third distributor which distributes an input signal received from the distortion remover to two output signals, and a third electrical to optical converter which converts a fifth output signal of the two output signals of the third distributor to an optical signal. The wireless key base station further includes a third optical to electrical converter which converts the optical signal transmitted from the third electrical to optical converter through the optical transmitter to an electrical signal, and a detection and control device which detects the output electrical signal of the third optical to electrical converter to control the first adjuster.

Preferably, in the second wireless communication base station system, the wireless key base station further includes a fourth distributor which distributes the first output signal of the first distributor to two output signals, and a third combiner which combines the output electrical signal of the third optical to electrical converter and a sixth output signal of the two output signals of the fourth distributor. The first electrical to optical converter converts a seventh output signal of the two output signals of the fourth distributor to an optical signal. The detection and control device detects an output signal of the third combiner to control the first adjuster.

Preferably, in the second wireless communication base station system, the wireless key base station further includes a third combiner. The first distributor further includes a first output terminal and distributes the input signal received from the modulator to three output signals to output one of the three output signals to the first output terminal. The first output terminal is connected to the third combiner. The third combiner combines the output electrical signal of the third optical to electrical converter and the output signal from the first output terminal. The detection and control device detects an output signal of the third combiner to control the first adjuster.

Preferably, the optical forward base station further includes an antenna duplexer which includes a second terminal to which a signal to be transmitted from the optical forward base station is input, a third terminal connected to an antenna, a fourth terminal connected to a third low-noise amplifier which amplifies a signal received by the antenna, and a fourth electrical to optical converter which is connected to an output terminal of the third low-noise amplifier and converts an output signal of the third low-noise amplifier to an optical signal. The wireless key base station further includes a fourth optical to electrical converter which converts the optical signal transmitted from the fourth electrical to optical converter through the optical transmitter to an electrical signal, and a demodulator which demodulates the output electrical signal of the fourth optical to electrical converter.

The third wireless communication base station system according to the present invention includes one wireless key base station, N optical forward base stations where N is a positive integer of 2 or more, and an optical transmitter which connects the wireless key base station and the optical forward base stations. The wireless key base station includes a modulator which modulates an input signal, a first distributor which distributes an input signal received from the modulator to two output signals, a second distributor which distributes a first output signal of the two output signals of the first distributor to N output signals, a distortion extracter which extracts a distortion component from a signal obtained by amplifying a second output signal of the two output signals of the first distributor, a third distributor which distributes an output signal of the distortion extracter to N output signals, N first electrical to optical converters each of which converts one of the N output signals of the second distributor to an optical signal, and N second electrical to optical converters each of which converts one of the N output signals of the third distributor to an optical signals. Each of the N optical forward base stations includes a first optical to electrical converter which converts the optical signal transmitted from one of the N first electrical to optical converters through the optical transmitter to an electrical signal, a second optical to electrical converter which converts the optical signal transmitted from one of the N second electrical to optical converters through the optical transmitter to an electrical signal, and a distortion remover which generates an amplified signal from which the distortion component is removed by using the output electrical signal of the first optical to electrical converter and the output electrical signal of the second optical to electrical converter.

Preferably, in the third wireless communication base station system, the distortion remover includes a power amplifier which amplifies the output electrical signal of the first optical to electrical converter, and a combiner which combines an output signal of the power amplifier and the output electrical signal of the second optical to electrical converter.

Preferably, in the third wireless communication base station system, the distortion remover includes a combiner which combines the output electrical signal of the first optical to electrical converter and the output electrical signal of the second optical to electrical converter, and a power amplifier which amplifies an output signal of the combiner.

Preferably, the optical transmitter includes a plurality of optical fibers, each of which directly connects one of the electrical to optical converters and one of the optical to electrical converters.

Preferably, at least one of the plurality of optical fibers has a length different from the length(s) of the other(s).

Preferably, the optical transmitter includes a first optical multiplex and demultiplex device connected to the wireless key base station to multiplex a plurality of optical signals and demultiplex one optical signal, a second optical multiplex and demultiplex device connected to the optical forward base station to multiplex a plurality of optical signals and demultiplex one optical signal, and an optical fiber which connects the first and second optical multiplex and demultiplex devices to each other.

(Effect Being Advantage More Than Prior Art)

According to the wireless communication base station system including an optical forward base station of the present invention, distortion of a signal transmitted from the optical forward base station can be reduced because a part of a distortion compensation circuit is placed in a wireless key base station. Further, according to the system of the present invention, distortion of the signal transmitted from the optical forward base station can be reduced, and at the same time, the power efficiency of the optical forward base station can be improved, and the optical forward base station can be reduced in size.

BEST MODE FOR CARRYING OUT THE INVENTION

The following description is a detailed description of the main embodiments of the invention, with reference to the accompanying drawings in which the same numerical references identify the same elements in each of the different figures.

<First Embodiment>

Figure 1:
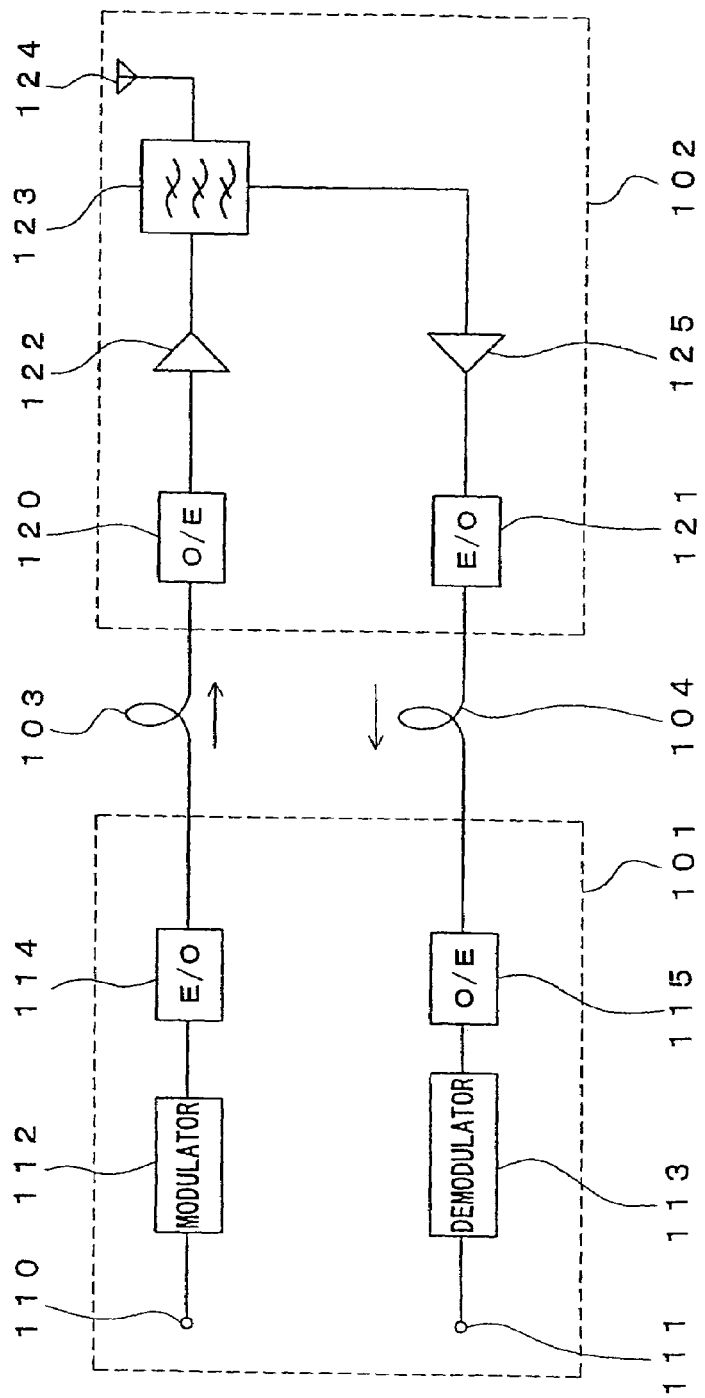
FIG. 1 is a block diagram of a conventional wireless communication base station system including an optical forward base station.
Figure 2:
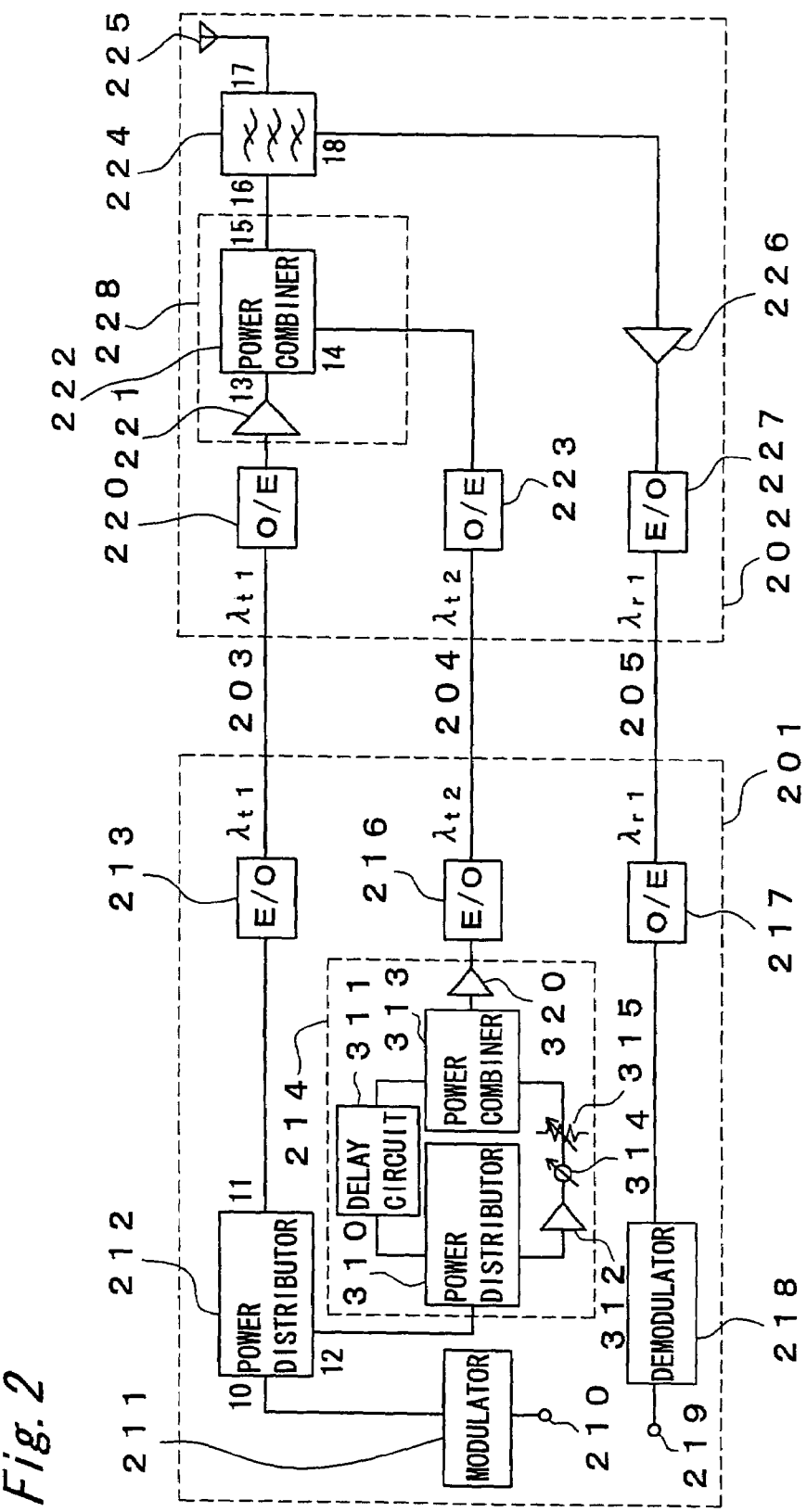
FIG. 2 is a block diagram of a wireless communication base station system including an optical forward base station according to a first embodiment of the present invention.

FIG. 2 is a block diagram of a wireless communication base station system including an optical forward base station according to a first embodiment of the present invention. As shown in FIG. 2, a wireless key base station 201 and an optical forward base station 202 are connected to each other by optical fibers 203, 204, and 205 serving as an optical transmitter.

First, the configuration of the wireless key base station 201 will be described below. An input terminal 210 for a baseband signal is connected to a modulator 211. An output terminal of the modulator 211 is connected to a terminal 10 of a power distributor 212. A terminal 11 of the power distributor 212 is connected to an electrical to optical converter 213, while another terminal 12 of the power distributor 212 is connected to a distortion extraction circuit 214. An output terminal of the distortion extraction circuit 214 is connected to an electrical to optical converter 216. Output terminals of the electrical to optical converter 213 and the electrical to optical converter 216 are connected to the optical fibers 203 and 204, respectively.

In addition, an input terminal of an optical to electrical converter 217 is connected to the optical fiber 205, and an output terminal thereof is connected to a demodulator 218. And an output terminal of the demodulator 218 is connected to an output terminal 219 for a baseband signal.

Next, the configuration of the optical forward base station 202 will be described below. The optical fiber 203 and an optical to electrical converter 220 are connected to each other. An output terminal of the optical to electrical converter 220 and an input terminal of a power amplifier 221 are connected to each other, and an output terminal of the power amplifier 221 is connected to a terminal 13 of a power combiner 222. Meanwhile, the optical fiber 204 and an optical to electrical converter 223 are connected to each other. An output terminal of the optical to electrical converter 223 is connected to a terminal 14 of the power combiner 222. A terminal 15 of the power combiner 222 is connected to a terminal 16 of an antenna duplexer 224. A terminal 17 of the antenna duplexer 224 is connected to an antenna 225, and a terminal 18 of the antenna duplexer 224 is connected to a low-noise amplifier 226. An output terminal of the low-noise amplifier 226 is connected to an input terminal of an electrical to optical converter 227. An output terminal of the electrical to optical converter 227 is connected to the optical fiber 205.

For example, the optical to electrical converters 217, 220 and 223 may be diodes for light detection such as photodiodes. The electrical to optical converters 213, 216 and 227 may be laser diodes using Distributed feedback (DFB) lasers or Fabry-Perot lasers.

The operation of the wireless communication base station system including the optical forward base station 202 constituted as described above will be described below. First, signal transmission from the wireless key base station 201 to the optical forward base station 202 will be described. A baseband signal input to the input terminal 210 for a baseband signal is converted to a high-frequency modulation signal and output by the modulator 211. The converted signal is input to the terminal 10 of the power distributor 212, distributed and output to the terminals 11 and 12. A signal output from the terminal 11 is modulated into an optical signal having a wavelength of $\lambda_{t1}$ by the electrical to optical converter 213. The optical signal having the wavelength of $\lambda_{t1}$ modulated by a signal component output from the terminal 11 is transmitted by the optical fiber 203 to the optical forward base station 202.

Figure 3:
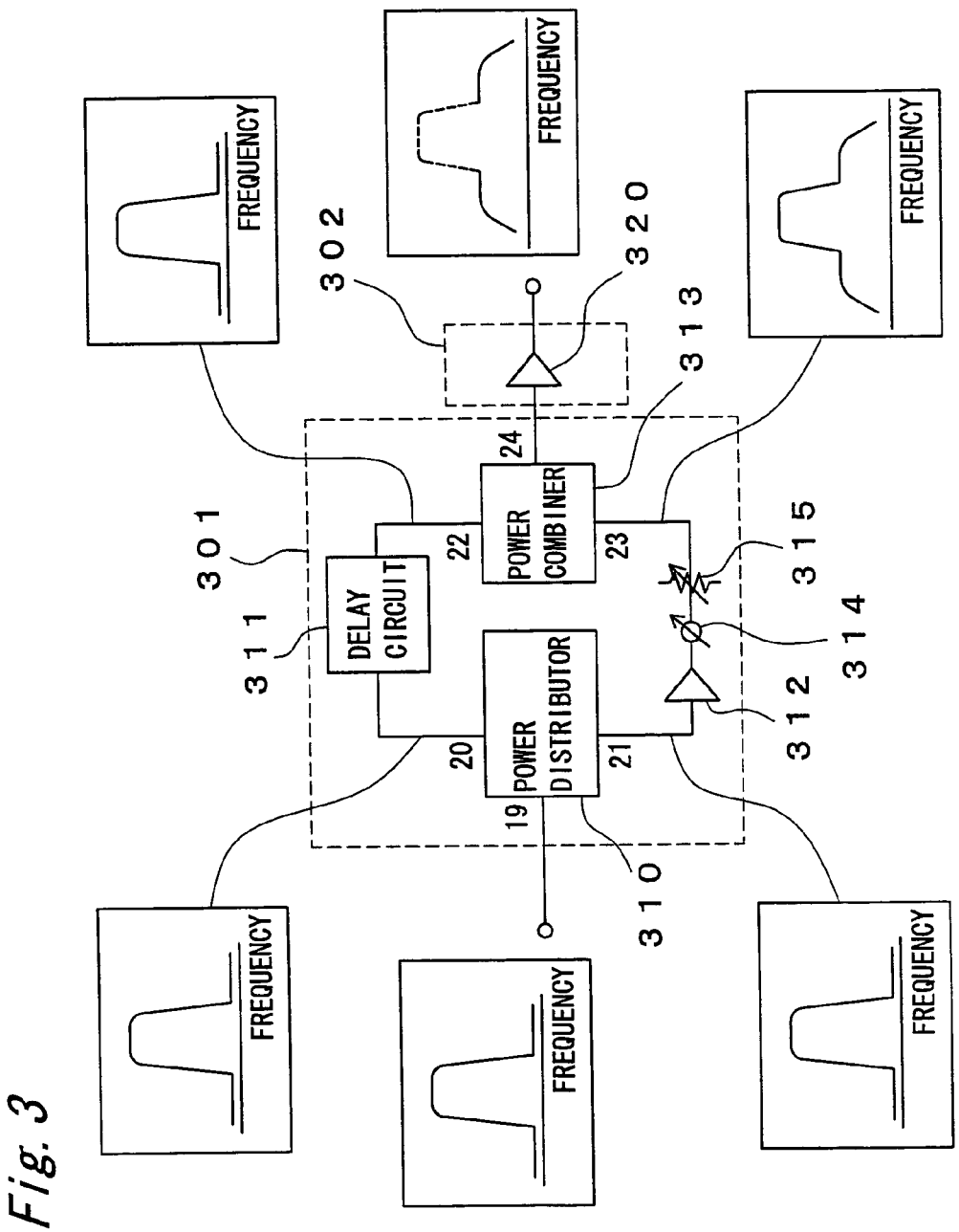
FIG. 3 is a block diagram of a distortion extraction circuit used in the wireless communication base station according to the first embodiment of the present invention.

Meanwhile, a signal output from the terminal 12 of the power distributor 212 is input to the distortion extraction circuit 214. The distortion extraction circuit 214 extracts only a distortion component of a signal obtained by amplifying the input signal. FIG. 3 shows an example of the configuration of the distortion extraction circuit 214.

The distortion extraction circuit as shown in FIG. 3 includes a distortion signal extraction part 301 and a distortion signal adjustment part 302. The distortion signal extraction part 301 includes a power distributor 310, a delay circuit 311, an amplifier 312, a power combiner 313, a variable phase shifter 314, and a variable attenuator 315. The distortion signal adjustment part 302 includes an auxiliary amplifier 320. A terminal 20 serving as one output terminal of the power distributor 310 is connected to the delay circuit 311, and a terminal 21 serving as another output terminal thereof is connected to the amplifier 312. The output terminal of the amplifier 312 is sequentially connected to the variable phase shifter 314 and the variable attenuator 315. An output terminal of the delay circuit 311 and that of the variable attenuator 315 are connected to terminals 22 and 23 of the power combiner 313, respectively. An output terminal of the power combiner 313 is connected to the distortion signal adjustment part 302. More specifically, the output terminal of the power combiner 313 is connected to the auxiliary amplifier 320.

The operation of the distortion extraction circuit 214 will be described below. A signal output from the terminal 12 of the power distributor 212 shown in FIG. 2 is input to an terminal 19 of the power distributor 310 shown in FIG. 3. In the power distributor 310, the signal input to the terminal 19 is distributed and output to the terminals 20 and 21. A signal output from the terminal 20 of the power distributor 310 is input to the terminal 22 of the power combiner 313 through the delay circuit 311. Meanwhile, a signal output from the terminal 21 of the power distributor 310 is amplified by the amplifier 312. From the amplifier 312, a signal having a distortion component is output. The signal having the distortion component is adjusted in phase and amplitude through the variable phase shifter 314 and the variable attenuator 315. Thereafter the signal is input to the terminal 23 of the power combiner 313. Here, in the power combiner 313, a signal component input to the terminal 22 of the power combiner 313 and that input to the terminal 23 thereof are combined with their amplitudes equal to each other and their phases different by 180° from each other by adjusting the distribution ratio of the power distributor 310, the combination ratio of the power combiner 313, the delay circuit 311, the variable phase shifter 314, and the variable attenuator 315. Therefore, at a terminal 24 of the power combiner 313, the signal consisting of only a distortion component, a desired signal component of which is suppressed, can be extracted. Then, the distortion component extracted at the terminal 24 of the power combiner 313 is amplified to a desired level by the auxiliary amplifier 320.

Figure 4:
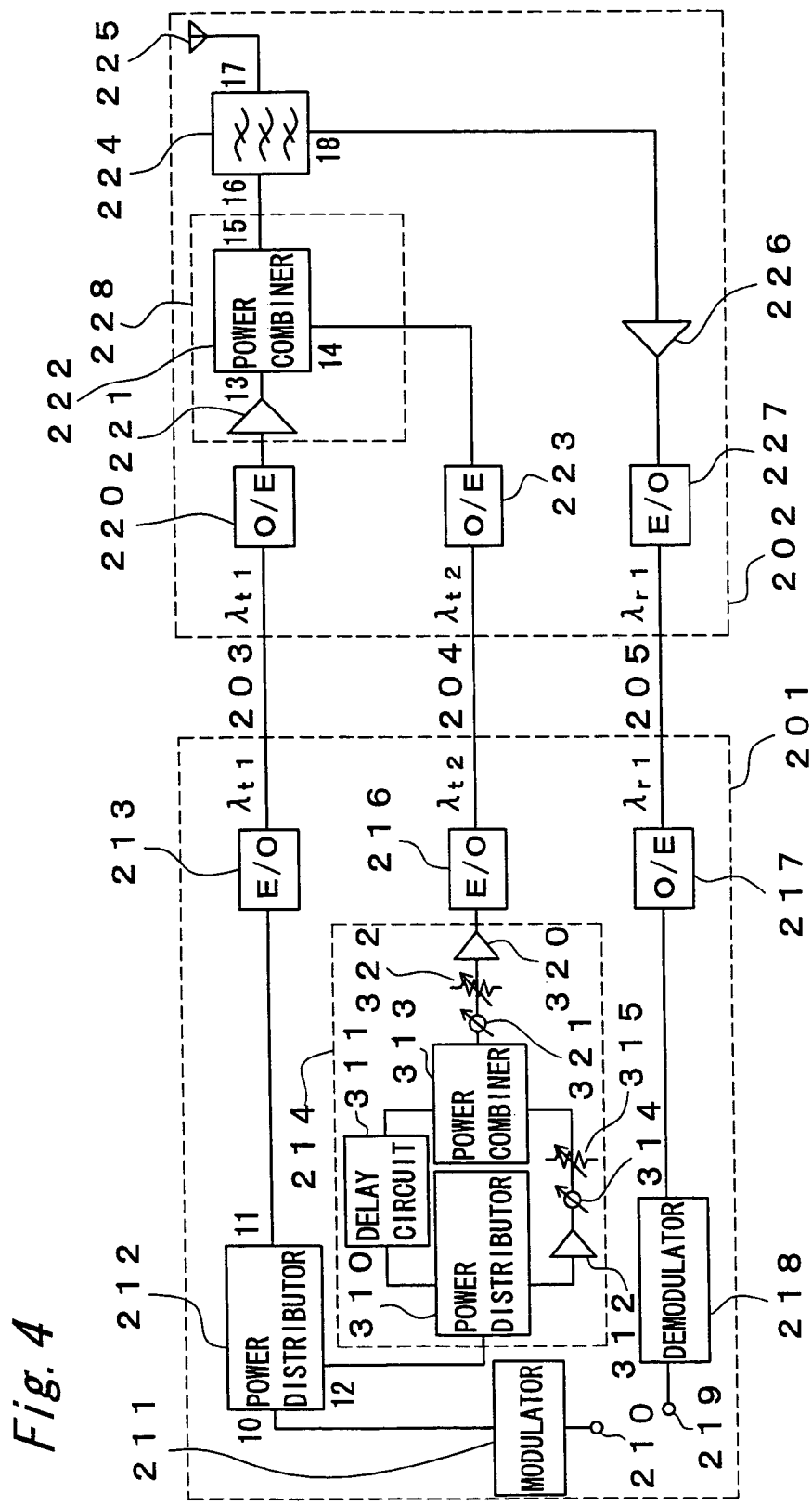
FIG. 4 is a block diagram of a wireless communication base station system according to the first embodiment of the present invention where a distortion extraction circuit is modified.

The distortion signal adjustment part 302 may further include a variable phase shifter 321 which can adjust the phase of the distortion component extracted at the terminal 24 of the power combiner 313 and a variable attenuator 322 which can adjust the amplitude thereof. FIG. 4 shows an example of the wireless communication base station system including these parts.

The distortion component amplified to the desired level by the auxiliary amplifier 320 is modulated into an optical signal having a wavelength of $\lambda_{t2}$ by the electrical to optical converter 216 shown in FIG. 2. The optical signal having the wavelength of $\lambda_{t2}$ modulated by the distortion component is transmitted by the optical fiber 204 to the optical forward base station 202.

The optical signal having the wavelength of $\lambda_{t1}$ and that having the wavelength of $\lambda_{t2}$ are transmitted to the optical forward base station 202 through the optical fibers 203 and 204, respectively. The optical signal having the wavelength of $\lambda_{t1}$ is input to the optical to electrical converter 220 and converted to a high-frequency signal having only a signal component by the optical to electrical converter 220. Meanwhile, the optical signal having the wavelength of $\lambda_{t2}$ is converted to a high-frequency signal having only a distortion component by the optical to electrical converter 223.

Figure 5:
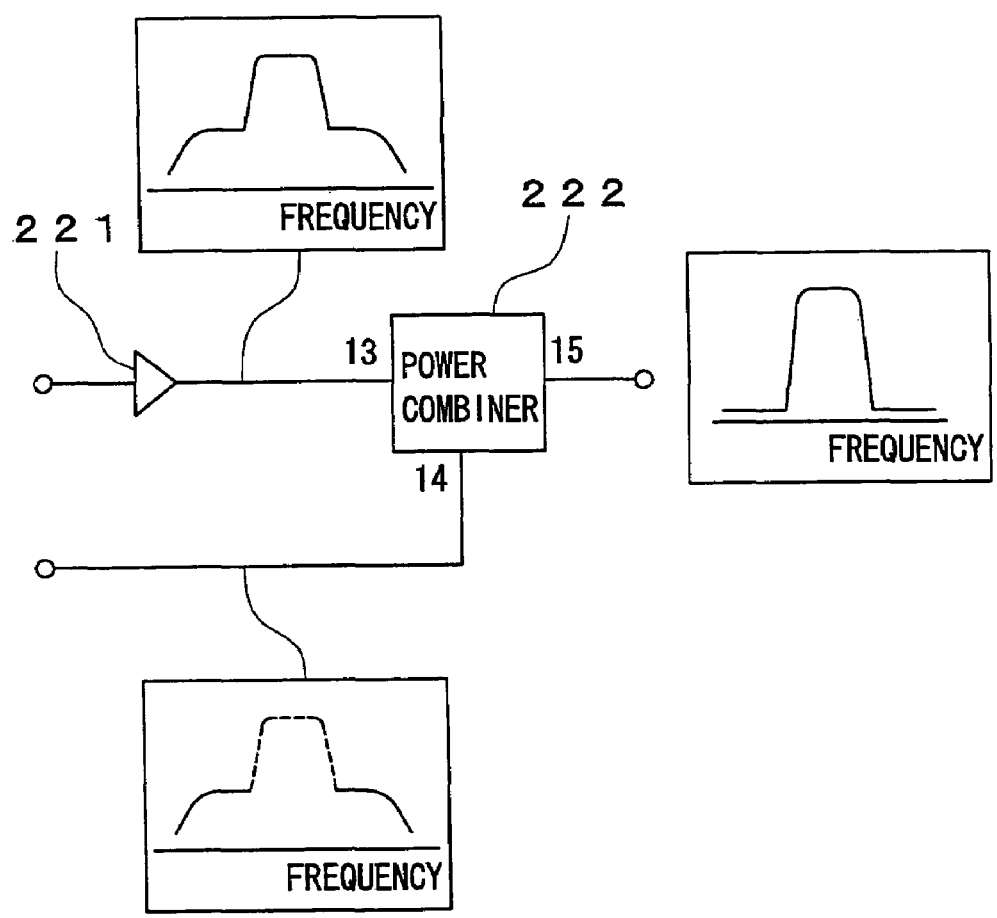
FIG. 5 is a block diagram of a distortion removal circuit used in the wireless communication base station system according to the first embodiment of the present invention.

The operation of those high-frequency signal will be described below with reference to FIG. 5, which shows a distortion removal circuit 228 in FIG. 2. The high-frequency signal having only the signal component output from the optical to electrical converter 220 shown in FIG. 2 is amplified to a desired level by the power amplifier 221. At this time, the amplified signal includes a distortion component out of the desired band as shown in FIG. 5. The amplified signal is input to the terminal 13 of the power combiner 222. Meanwhile, the high-frequency signal having only the distortion component output from the optical to electrical converter 223 shown in FIG. 2 is input to the terminal 14 of the power combiner 222. In this case, the signal whose distortion component is suppressed is output from the terminal 15 of the power combiner 222 by adjusting the distortion signal adjustment part 302 in the distortion extraction circuit 214 in such a way that the distortion components of the signals input to the terminals 13 and 14 of the power combiner 222 are combined with their amplitudes equal to and their phases opposite to each other. The signal whose distortion component is suppressed is radiated from the antenna 225 through the antenna duplexer 224 shown in FIG. 2.

The amplifier used in the distortion extraction circuit 214 such as the amplifier 312 shown in FIG. 3 is preferably the same as the power amplifier 221 used in the optical forward base station 202. However, if a distortion component generated because of amplifying the signal by the power amplifier 221 can be canceled, the amplifier 312 may not be the same as the power amplifier 221.

Each of the power amplifier 221, the amplifier 312, and the auxiliary amplifier 320 may be one or more field effect transistors (FET) using, e.g., silicon or GaAs as a semiconductor material.

Further, a circuit for adjusting the phase of the distortion component may be installed in a path between the output terminal of the distortion extraction circuit 214 and the terminal 14 of the power combiner 222 such that the distortion components of the signals input to the terminals 13 and 14 of the power combiner 222 are combined with their phases accurately opposite to each other.

Next, signal transmission from the optical forward base station 202 to the wireless key base station 201 will be described below. A signal received by the antenna 225 is output from the terminal 18 of the antenna duplexer 224 and amplified by the low-noise amplifier 226. An output signal of the low-noise amplifier 226 is converted to an optical signal having a wavelength of $\lambda_{r1}$ by the electrical to optical converter 227. This optical signal is transmitted to the wireless key base station 201 through the optical fiber 205. The transmitted optical signal is input to the optical to electrical converter 217 and converted to a high-frequency signal. The high-frequency signal is demodulated into a baseband signal by the demodulator 218. The baseband signal is output to the output terminal 219 for a baseband signal.

In general, power efficiency of the power amplifier is improved and the power consumption thereof can be reduced as the bias current thereof is reduced. A conventional system has had a problem that the distortion component of the output signal of the power amplifier increases at the same time as the bias current thereof is reduced. However, according to the system of this embodiment of the present invention, when a signal is transmitted from the optical forward base station 202 to a mobile telephone or the like, the signal whose distortion component is suppressed can be transmitted regardless of an operation point of the power amplifier 221 used in the optical forward base station 202. Therefore, the optical forward base station 202 can transmit a signal whose distortion is reduced, and, at the same time, can be operated with its bias current reduced. Thus, the power efficiency of the optical forward base station 202 as a whole can be improved. Also, the auxiliary amplifier 320 used as a part of the distortion compensation circuit is used in the wireless key base station 201, so that the power efficiency of the optical forward base station 202 as a whole can be improved.

As a result, the circuit scale of the optical forward base station 202 can be reduced, and, at the same time, a size required for heat radiation can be reduced, so that the size of the optical forward base station 202 as a whole can be reduced. In addition, load on the optical forward base station 202 can be reduced since all control required for canceling the distortion component of the signal transmitted from the optical forward base station 202 to a mobile telephone or the like can be performed on the side of the wireless key base station 201.

Figure 6:
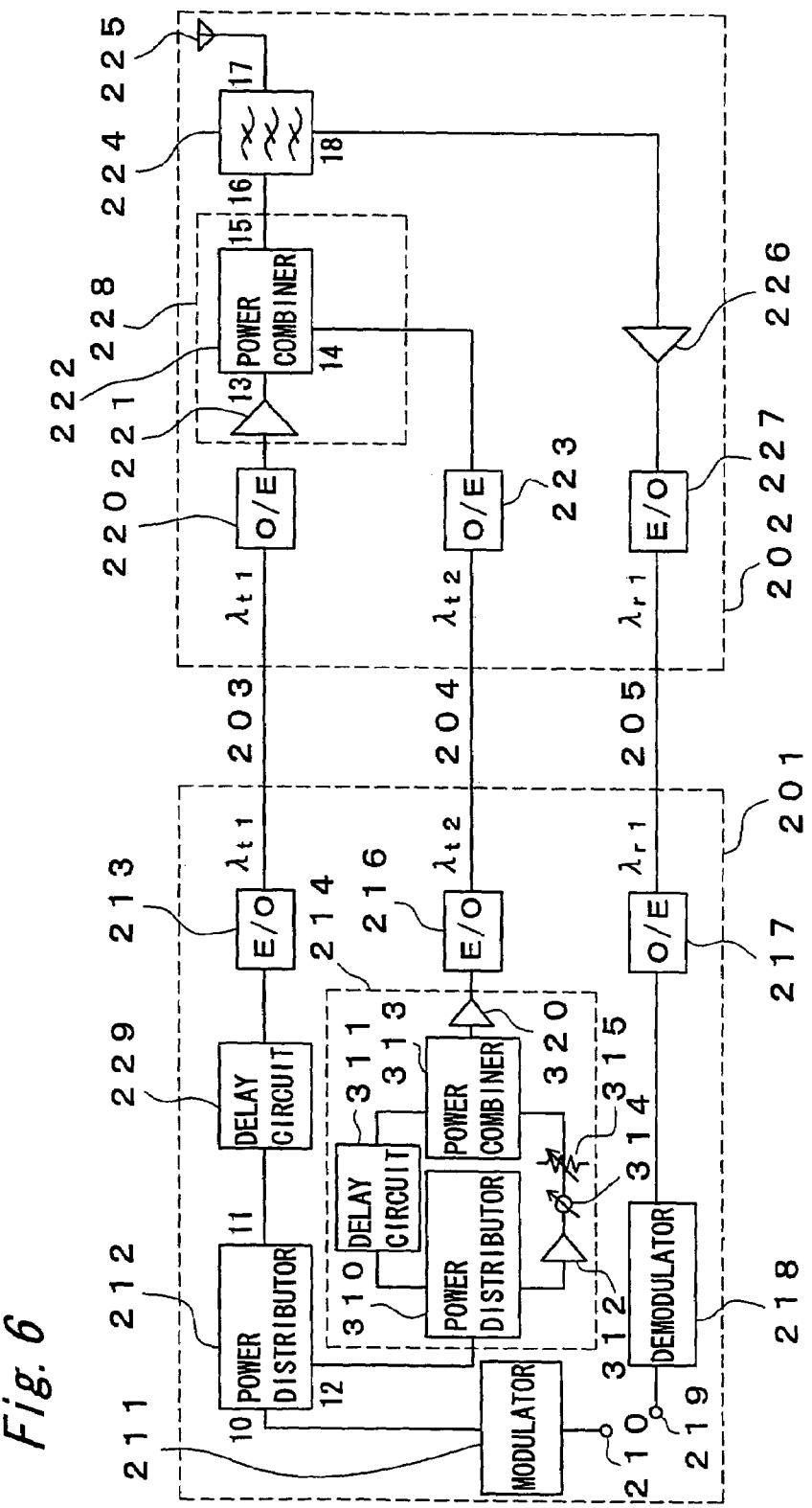
FIG. 6 is a block diagram of a system obtained by installing a delay circuit in the wireless communication base station system according to the first embodiment of the present invention.

When two signals are combined with each other in the power combiner 222 of the optical forward base station 202, delay is caused by a distortion extraction process in the distortion extraction circuit 214 in some cases. When two signals are not simultaneously input to the power combiner 222, for example, as shown in FIG. 6, a delay circuit 229 may be connected between the power distributor 212 and the electrical to optical converter 213 in the wireless key base station 201, so that the transmission times of the two signals are adjusted to be equal to each other. In addition, the delay circuit 229 may be connected between the optical to electrical converter 220 and the power amplifier 221 in the optical forward base station 202.

<Second Embodiment>

Figure 7:
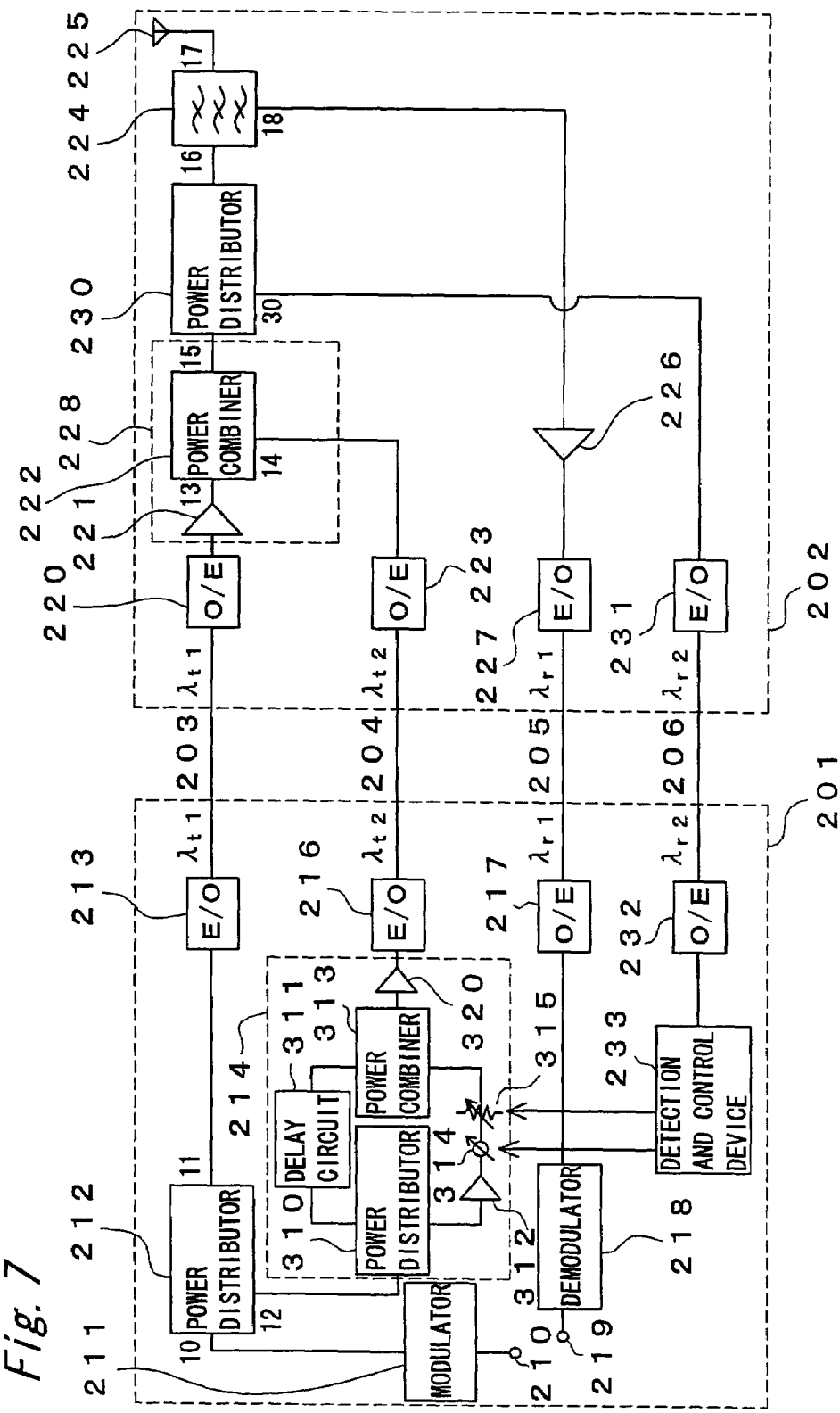
FIG. 7 is a block diagram of a wireless communication base station system including an optical forward base station according to a second embodiment of the present invention.

FIG. 7 is a block diagram of a wireless communication base station system according to a second embodiment of the present invention. With reference to FIG. 7, different points between the systems according to the first and second embodiments will be described below. According to the system of this embodiment, the optical forward base station 202 further includes a power distributor 230 and an electrical to optical converter 231, and the wireless key base station system 201 further includes an optical to electrical converter 231 and a detection and control device 233. The electrical to optical converter 231 and the optical to electrical converter 232 are connected to each other with an optical fiber 206. In the system according to this embodiment, a part of the output signal of the power combiner 222 in the optical forward base station 202 is distributed and the distributed signal is output to a terminal 30 of the power distributor 230 as a monitor output. This output signal is converted to an optical signal having a wavelength of $\lambda_{r2}$ by the electrical to optical converter 231. This optical signal is transmitted to the wireless key base station 201 through the optical fiber 206. The optical signal having the wavelength of $\lambda_{r2}$ transmitted to the wireless key base station 201 is converted to a high-frequency signal by the optical to electrical converter 232. This high-frequency signal is input to the detection and control device 233 to detect the power of the signal.

The high-frequency signal input to the detection and control device 233 changes depending on the level of a transmission power from the optical forward base station 202 to a mobile telephone or the like. Thus, monitoring the high-frequency signal is equivalent to monitoring the level of the transmission power of the optical forward base station 202. Therefore, it is possible to always check whether the operation of the optical forward base station 202 is normal or not by monitoring this level. This has an advantage in maintenance of the optical forward base station 202 since the optical forward base station 202 is generally often placed in the open air, and therefore, it is difficult to always monitor the operation of it.

As in the system according to this embodiment, monitoring the output power of the optical forward base station 202 in the wireless key base station 201 makes it possible to control the components of the distortion extraction circuit 214, as such the variable phase shifter 314 and the variable attenuator 315 which serve to suppress the distortion of the signal transmitted from the optical forward base station 202 to a mobile telephone or the like, depending on the output power. In addition, the distortion extraction circuit 214 may further include the variable phase shifter 321 and the variable attenuator 322 as shown in FIG. 4. In this case, the variable phase shifter 321 and the variable attenuator 322 can be also controlled as described above. As a result, even though the output power of the optical forward base station 202 varies, the distortion of the signal transmitted from the optical forward base station 202 to a mobile telephone or the like can be appropriately suppressed. Moreover, in the system according to this embodiment, the same advantage can be obtained as in the system according to the first embodiment.

Furthermore, the delay circuit 229 may be connected between the power distributor 212 and the electrical to optical converter 213 in the wireless key base station 201 or between the optical to electrical converter 220 and the power amplifier 221 in the optical forward base station 202. Even in that case, the same advantage as described above can be obtained.

<Third Embodiment>

Figure 8:
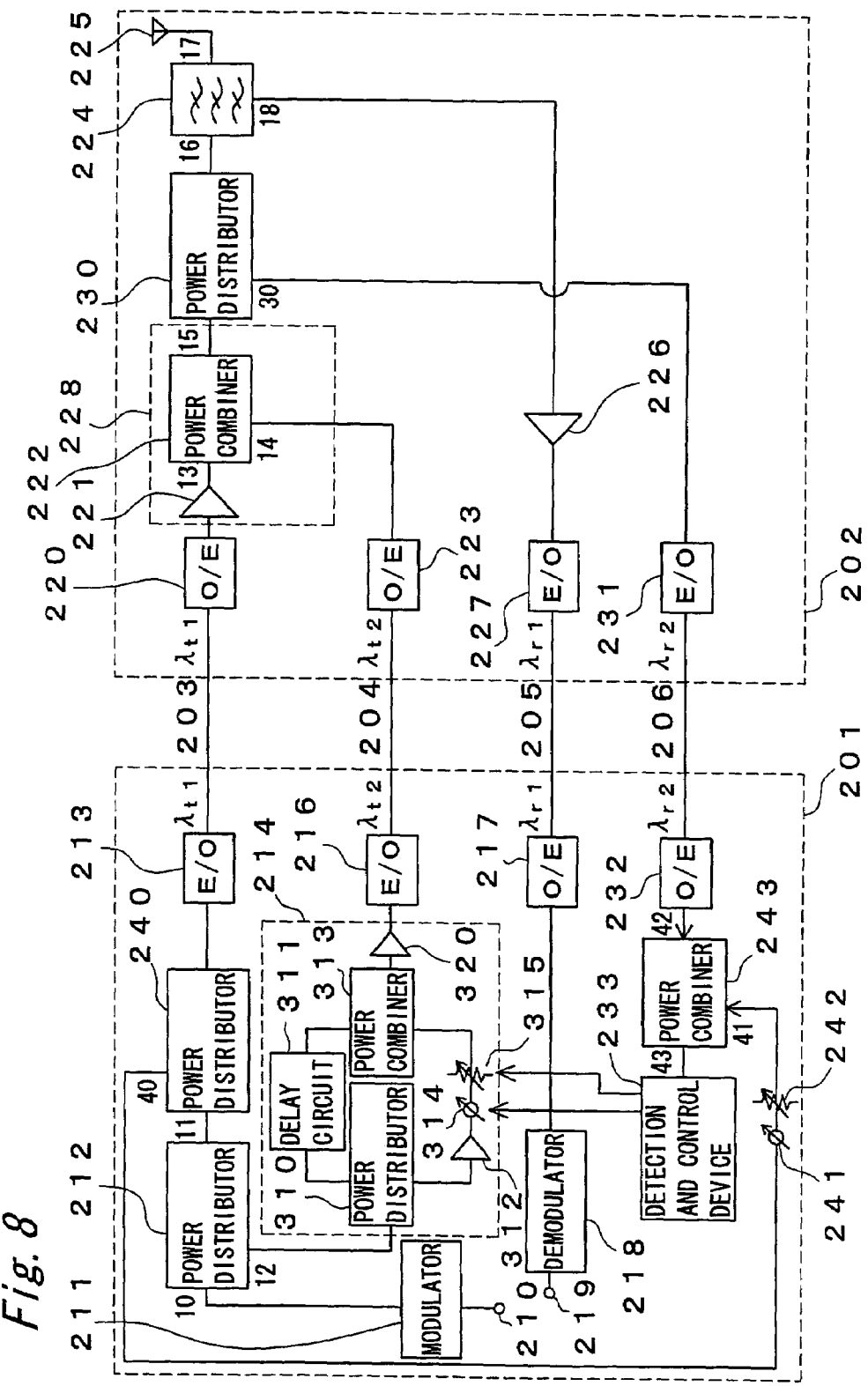
FIG. 8 is a block diagram of a wireless communication base station system including an optical forward base station according to a third embodiment of the present invention.

FIG. 8 is a block diagram of a wireless communication base station system according to a third embodiment of the present invention. With reference to FIG. 8, different points between the systems according to the second and third embodiments will be described below. In the system according to the second embodiment, a part of the output signal of the power combiner 222 in the optical forward base station 202 is extracted as a monitor output, and the monitor output is detected by the detection and control device 233 in the wireless key base station 201. However, in the system according to this embodiment, instead of monitoring the output power of the optical forward base station 202, only a distortion component included in the output signal of the optical forward base station 202 is detected by the detection and control device 233 in the wireless key base station 201.

The operation of the system according to this embodiment will be described below. The high-frequency signal output from the output terminal of the modulator 211 in the wireless key base station 201 is distributed by the power distributor 212 and output to the terminals 11 and 12 thereof. In the system according to the second embodiment, the output signal at the terminal 11 is directly input to the electrical-optical converter 213. However, in the system according to this embodiment, a part of the output signal at the terminal 11 is output by the power distributor 240, which is further placed between the power distributor 212 and the electrical to optical converter 213, to a terminal 40 thereof. In addition, a power combiner 243 is further installed in the system according to this embodiment. The signal output from the terminal 40 of the power distributor 240 is adjusted in phase by the variable phase shifter 241 and in amplitude by the variable attenuator 242, and then input to a terminal 41 of the power combiner 243. Meanwhile, the signal transmitted through the optical fiber 206 is input to a terminal 42 of the power combiner 243 as in the system according to the second embodiment. The combiner 243 combines the signals input to the terminal 42 and the terminal 41 with their amplitudes equal to and their phases opposite to each other, so that only a distortion component included in the signal transmitted from the optical forward base station 202 to a mobile telephone or the like is extracted at a terminal 43 of the power combiner 243. The signal of the distortion component is input to the detection and control device 233 to detect the power of the signal.

Figure 9:
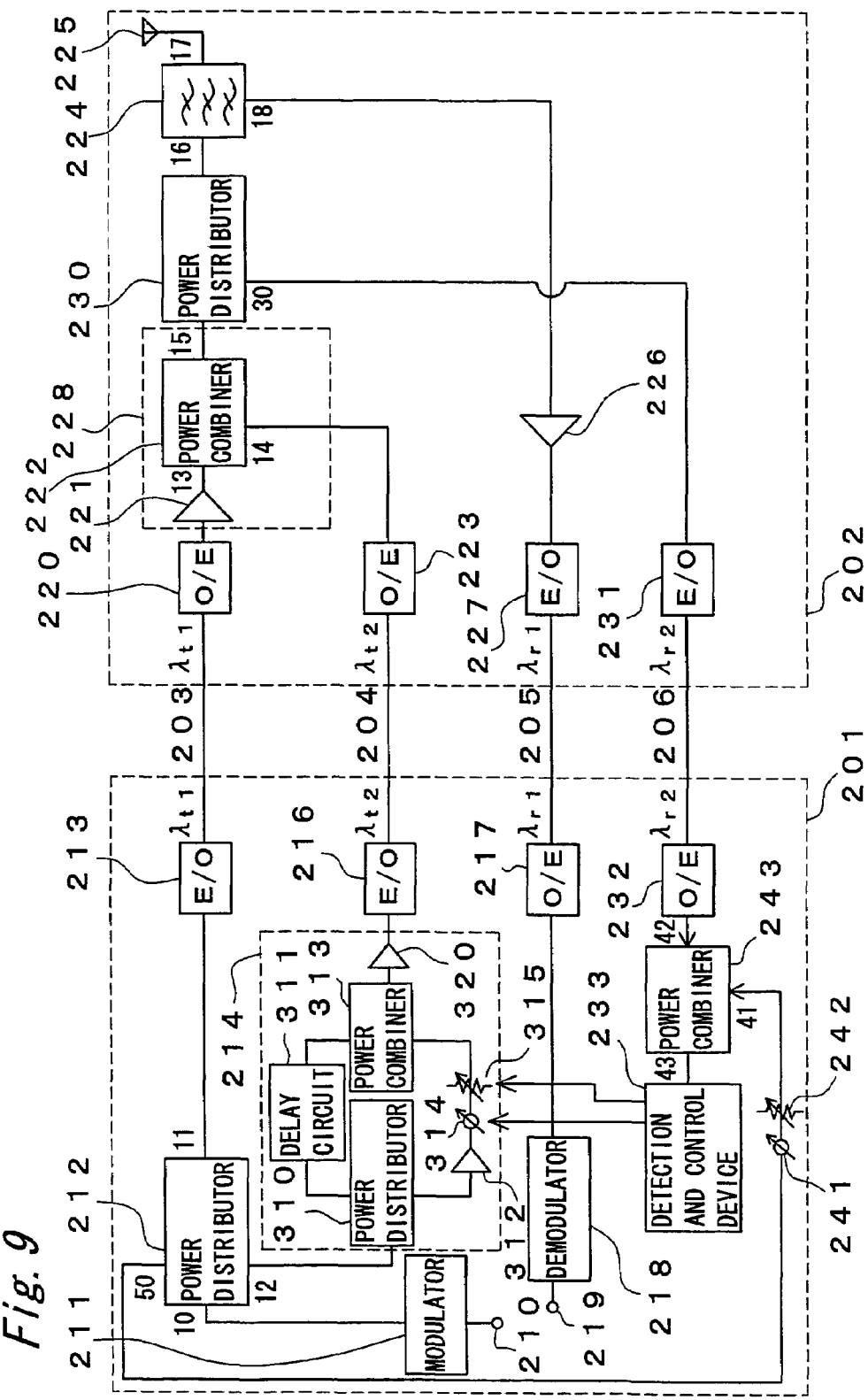
FIG. 9 is a block diagram of a wireless communication base station system according to the third embodiment of the present invention where a power distributor is modified.

Alternatively, instead of adding the power distributor 240, the signal output from another terminal 50 of the power distributor 212 may be input to the terminal 41 of the power combiner 243. FIG. 9 is a block diagram of the system in this case.

Detecting the power of the distortion component of the signal transmitted from the optical forward base station 202 to a mobile telephone or the like makes it possible to control the components of the distortion extraction circuit 214, as such the variable phase shifter 314 and the variable attenuator 315 which serve to suppress the distortion component, depending on the power of the distortion component. In addition, as shown in FIG. 4, the distortion extraction circuit 214 may further include the variable phase shifter 321 and the variable attenuator 322. In this case, the variable phase shifter 321 and the variable attenuator 322 can be also controlled as described above. More specifically, a distortion compensation circuit can be controlled such that the distortion component included in the signal transmitted from the optical forward base station 202 to a mobile telephone or the like is always minimum. Furthermore, in the system according to this embodiment, the same advantage can be obtained as in the system according to the second embodiment.

Furthermore, the system according to this embodiment includes the variable phase shifter 241 and the variable attenuator 242, but these elements can be optionally omitted.

Furthermore, the delay circuit 229 may be connected between the power distributor 212 and the electrical to optical converter 213 in the wireless key base station 201 or may be connected between the optical to electrical converter 220 and the power amplifier 221 in the optical forward base station 202. Even in that case, the same advantage as described above can be obtained.

Figure 10:
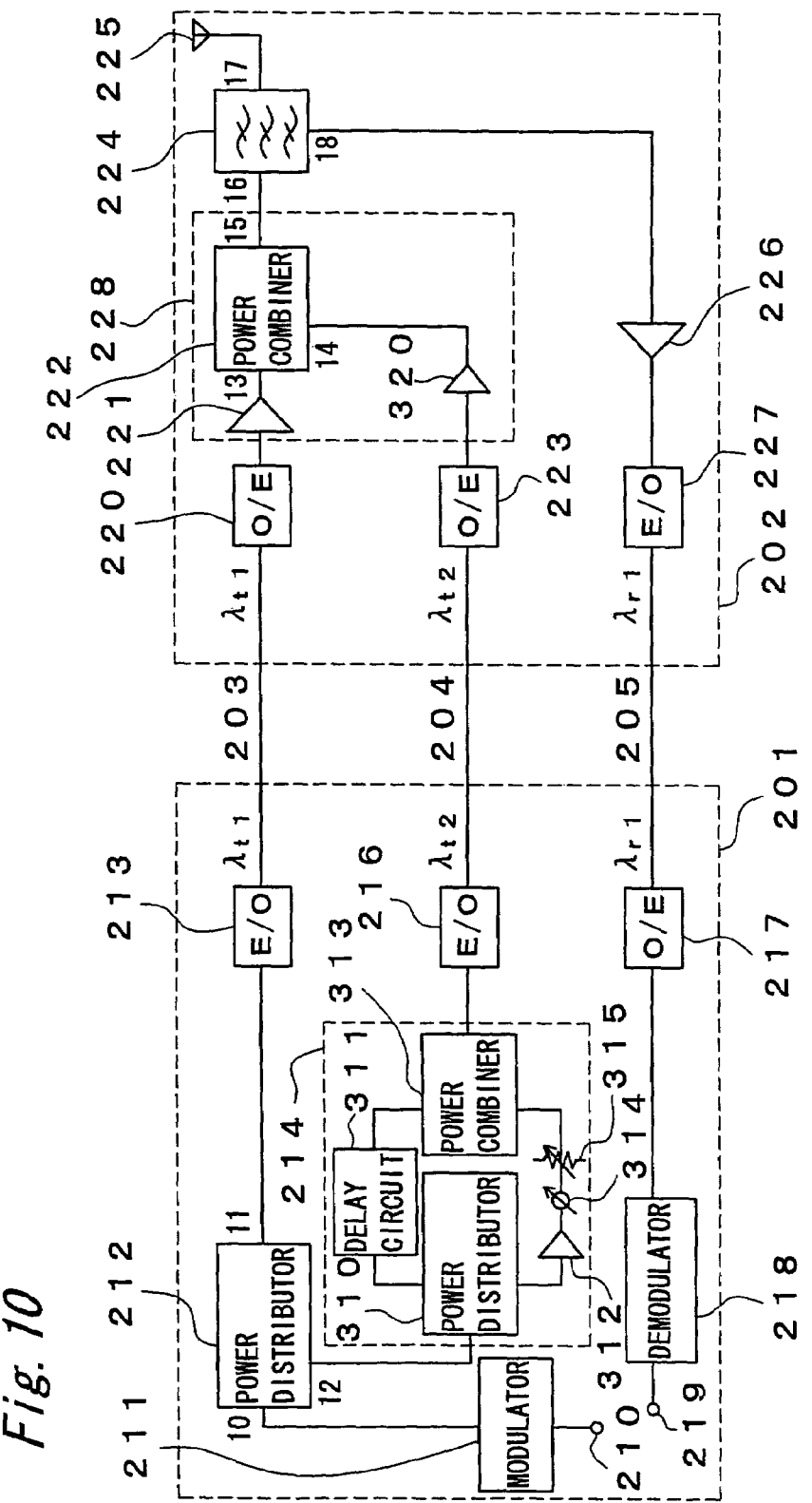
FIG. 10 is a block diagram of a wireless communication base station system according to the first embodiment of the present invention where the position of an auxiliary amplifier is changed.

In the systems according to the all embodiments described above, the auxiliary amplifier 320 is used in the distortion extraction circuit 214 of the wireless key base station. However, the auxiliary amplifier 320 may be used on the side of the optical forward base station 202. More specifically, the auxiliary amplifier 320 may be placed in an output circuit of the optical to electrical converter 223. This facilitates the design of the optical to electrical converter 223, since the dynamic range of the optical to electrical converter 223 can be reduced which converts the optical signal having a wavelength of $\lambda_{r2}$ modulated by the distortion component to a high-frequency signal. Moreover, the design of the electrical to optical converter 216 is also facilitated, since the level of the high-frequency signal (distortion component) modulated into an optical signal by the electrical to optical converter 216 may be low. As a result, the production costs of the optical to electrical converter 223 and the electrical to optical converter 216 can be reduced. FIG. 10 is a block diagram of the system according to the first embodiment where the modification is made as described above.

<Fourth Embodiment>

Figure 11:
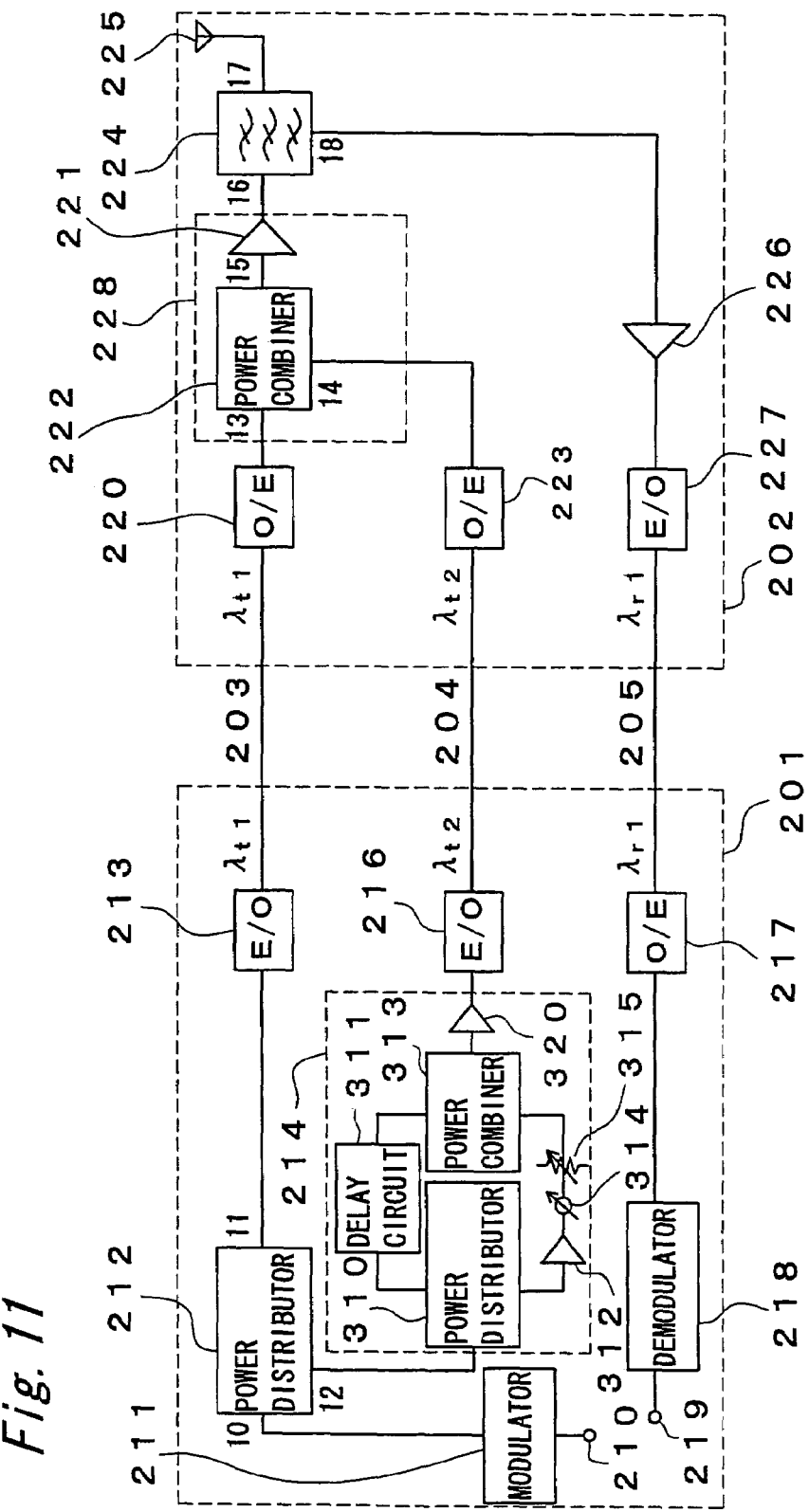
FIG. 11 is a block diagram of a wireless communication base station system including an optical forward base station according to a fourth embodiment of the present invention.

FIG. 11 is a block diagram of a wireless communication base station system according to a fourth embodiment of the present invention. With reference to FIG. 11, different points between the systems according to the first and fourth embodiments will be described below. In the system according to this embodiment, the power combiner 222 is placed between the optical to electrical converter 220 and the power amplifier 221 and between the optical to electrical converter 223 and the power amplifier 221. More specifically, a signal component transmitted through the optical fiber 203 is combined with a distortion component transmitted through the optical fiber 204 before the signal component is input to the power amplifier 221.

An operation of the distortion removal circuit 228 shown in FIG. 11 will be described below. The high-frequency signal output from the optical to electrical converter 220 is input to the terminal 13 of the power combiner 222, and the high-frequency signal having only a distortion component output from the optical to electrical converter 223 is input to the terminal 14 of the power combiner 222. A signal combined by the power combiner 222 is output from the terminal 15 thereof. Thereafter, the output signal from the terminal 15 is amplified to a desired level by the power amplifier 221. In this case, a distortion component of a signal generated by amplifying the high-frequency signal input to the terminal 13 and a signal obtained by amplifying a high-frequency signal input to the terminal 14 are combined with their amplitudes equal to and their phases opposite to each other, and are canceled out with each other. Thus, a desired signal whose distortion component is suppressed is output from the output terminal of the power amplifier 221.

As described above, when the system is constituted in such a way that those two signals are combined with each other before one of the two signals is input to the power amplifier 221, the distortion component transmitted through the optical fiber 204 can be combined with the signal component transmitted through the optical fiber 203 with the power level of the distortion component suppressed to a low level. Therefore, the amplification level of the auxiliary amplifier 320 can be reduced.

Furthermore, the dynamic range of the optical to electrical converter 216 can be reduced, so that the design thereof is facilitated, since the level of the high-frequency signal (distortion component) modulated by the electrical to optical converter 216 into an optical signal may be low. Also, the dynamic range of the optical to electrical converter 223 can be reduced which converts the optical signal having a wavelength of $\lambda_{r2}$ modulated by the distortion component to an high-frequency signal, so that the design thereof can be facilitated. As a result, the production costs of the electrical to optical converter 216 and the optical to electrical converter 223 can be reduced.

The configuration in which a signal component transmitted by the optical fiber 203 and the distortion component transmitted by the optical fiber 204 are combined with each other before the signal component is input to the power amplifier 221 as described above can be applied to all the above-mentioned embodiments shown in FIG. 4 and FIG. 6 to 12. In this case, the same advantage as described above can be obtained.

Figure 12:
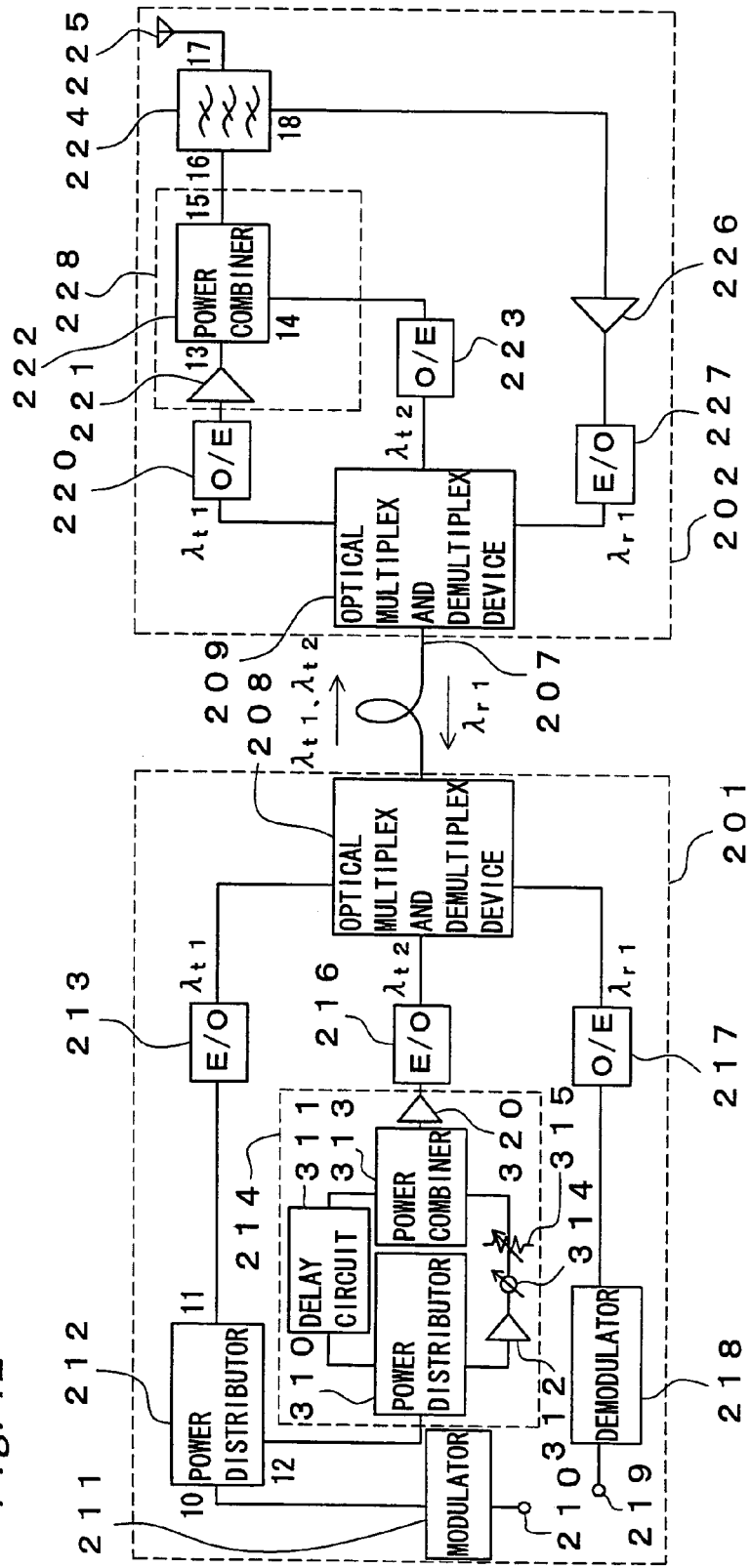
FIG. 12 is a block diagram of a wireless communication base station system according to the first embodiment of the present invention where an optical transmitter is modified.

In all the above-mentioned embodiments, one of a plurality of electrical to optical converters and one of a plurality of optical to electrical converters are directly connected to each other with an optical fiber. However, a wireless key base station and an optical forward base station can be connected to each other with one optical fiber by wavelength multiplexing. FIG. 12 shows an example of the system according to the first embodiment where the above modification is performed. As shown in FIG. 12, the wireless key base station 201 and the optical forward base station 202 include optical multiplex and demultiplex devices 208 and 209 which multiplex a plurality of optical signals and demultiplex an optical signal, respectively. The optical multiplex and demultiplex devices 208 and 209 are connected to each other by an optical fiber 207. The optical multiplex and demultiplex devices 208 and 209 may be optical couplers.

<Fifth Embodiment>

Figure 13:
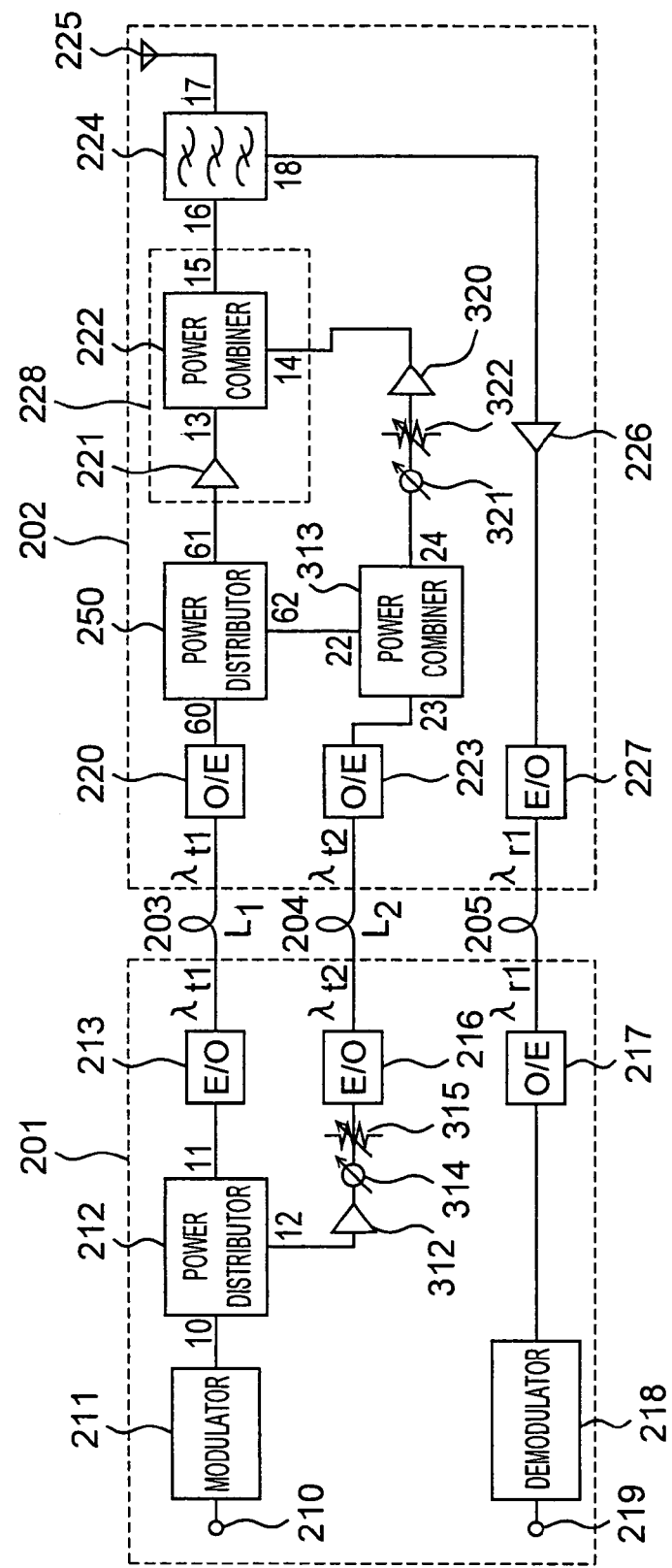
FIG. 13 is a block diagram of a wireless communication base station system including an optical forward base station according to a fifth embodiment of the present invention.

FIG. 13 is a block diagram of a wireless communication base station system according to a fifth embodiment of the present invention. First, the configuration of the wireless key base station 201 will be described below. The input terminal 210 for a baseband signal is connected to the modulator 211, and the output terminal of the modulator 211 is connected to the terminal 10 of the power distributor 212. The terminal 11 of the power distributor 212 is connected to the electrical to optical converter 213, while the terminal 12 thereof is connected to the amplifier 312. Following the amplifier 312, the variable phase shifter 314 and the variable attenuator 315 are placed in this order, and the output terminal of the variable attenuator 315 is connected to the electrical to optical converter 216. The output terminal of the electrical to optical converter 213 and that of the electrical to optical converter 216 are connected to the optical fiber 203 and the optical fiber 204, respectively.

The input terminal of the optical to electrical converter 217 is connected to the optical fiber 205, and the output terminal of the optical to electrical converter 217 is connected to the demodulator 218. The output terminal of the demodulator is connected to the output terminal 219 for a baseband signal.

Next, the configuration of the optical forward base station 202 will be described below. The optical fiber 203 is connected to the optical to electrical converter 220, and the output terminal of the optical to electrical converter 220 is connected to an input terminal 60 of a power distributor 250. An output terminal 62 of the power distributor 250 is connected to the input terminal 22 of the power combiner 313. The optical fiber 204 is connected to the optical to electrical converter 223, and the output terminal of the optical to electrical converter 223 is connected to the other input terminal 23 of the power combiner 313. The output terminal 24 of the power combiner 313 is connected to the auxiliary amplifier 320 through the variable phase shifter 321 and the variable attenuator 322. The output terminal of the auxiliary amplifier 320 is connected to the input terminal 14 of the power combiner 222.

Another output terminal 61 of the power distributor 250 is connected to the power amplifier 221. The output terminal of the power amplifier 221 is connected to the other input terminal 13 of the power combiner 222. The output terminal 15 of the power combiner 222 is connected to the terminal 16 of the antenna duplexer 224, and the terminal 17 of the antenna duplexer 224 is connected to the antenna 225. The terminal 18 of the antenna duplexer 224 is connected to the low-noise amplifier 226. And the output terminal of the low-noise amplifier 226 is connected to the input terminal of an electrical to optical converter 227. The output terminal of the electrical to optical converter 227 is connected to the optical fiber 205.

According to the system of this embodiment, the power combiner 313 placed in the distortion extraction circuit in FIG. 3 is placed in the optical forward base station 202. In this power combiner 313, a desired signal and a signal having a distortion component obtained by amplifying the desired signal are combined with each other with their amplitudes equal to each other and their phases different by 180° from each other. Thus, the signal constituting of a distortion component in which the component of the desired signal is suppressed is extracted at the terminal 24 of the power combiner 313. According to the system of this embodiment, a delay time between a signal output from the terminal 11 of the power distributor 212 and input to the terminal 22 of the power combiner 313 and a signal output from the terminal 12 of the power distributor 212 and input to the terminal 23 of the power combiner 313 is compensated by adjusting a length L1 of the optical fiber 203 and a length L2 of an optical fiber 204, that is, by making the length L1 of the optical fiber 203 larger than the length L2 of the optical fiber 204. Thus, delay circuits such as the delay circuit 311 shown in FIG. 2 and the delay circuit 229 shown in FIG. 7 can be removed, and therefore, the configuration of the wireless communication base station system can be made more simple.

Also, the optical fiber 203 and the optical fiber 204 which are different from each other in length may be installed in all the wireless communication base station systems described above, instead of installing a delay circuit in the wireless key base station 201 or the optical forward base station 202, in order to simultaneously input two signals to the power combiner 222.

Furthermore, the system may have a configuration of extracting a transmission signal transmitted from the optical forward base station to a mobile telephone or the like or a distortion component included in the transmission signal to control a variable phase shifter or a variable attenuator by the transmission signal or the distortion component as shown in FIG. 7 to 9.

Furthermore, power combiner 222 may be placed between the power distributor 250 and the power amplifier 221, and between the auxiliary amplifier 320 and the power amplifier 221 to combine a signal component transmitted by the optical fiber 203 and a distortion component of a signal transmitted by the optical fiber 204 with each other before the signal component is input to the power amplifier 221.

Furthermore, each of the wireless communication base station systems described above has both a path for transmitting a signal from the wireless key base station 201 to the optical forward base station 202 and a path for transmitting a signal from the optical forward base station 202 to the wireless key base station 201. However, it may have only one of these paths. In this case, the direction of signal transmission is limited to only one, but the wireless key base station 201 and the optical forward base station 202 can be reduced in size.

<Sixth Embodiment>

Figure 14:
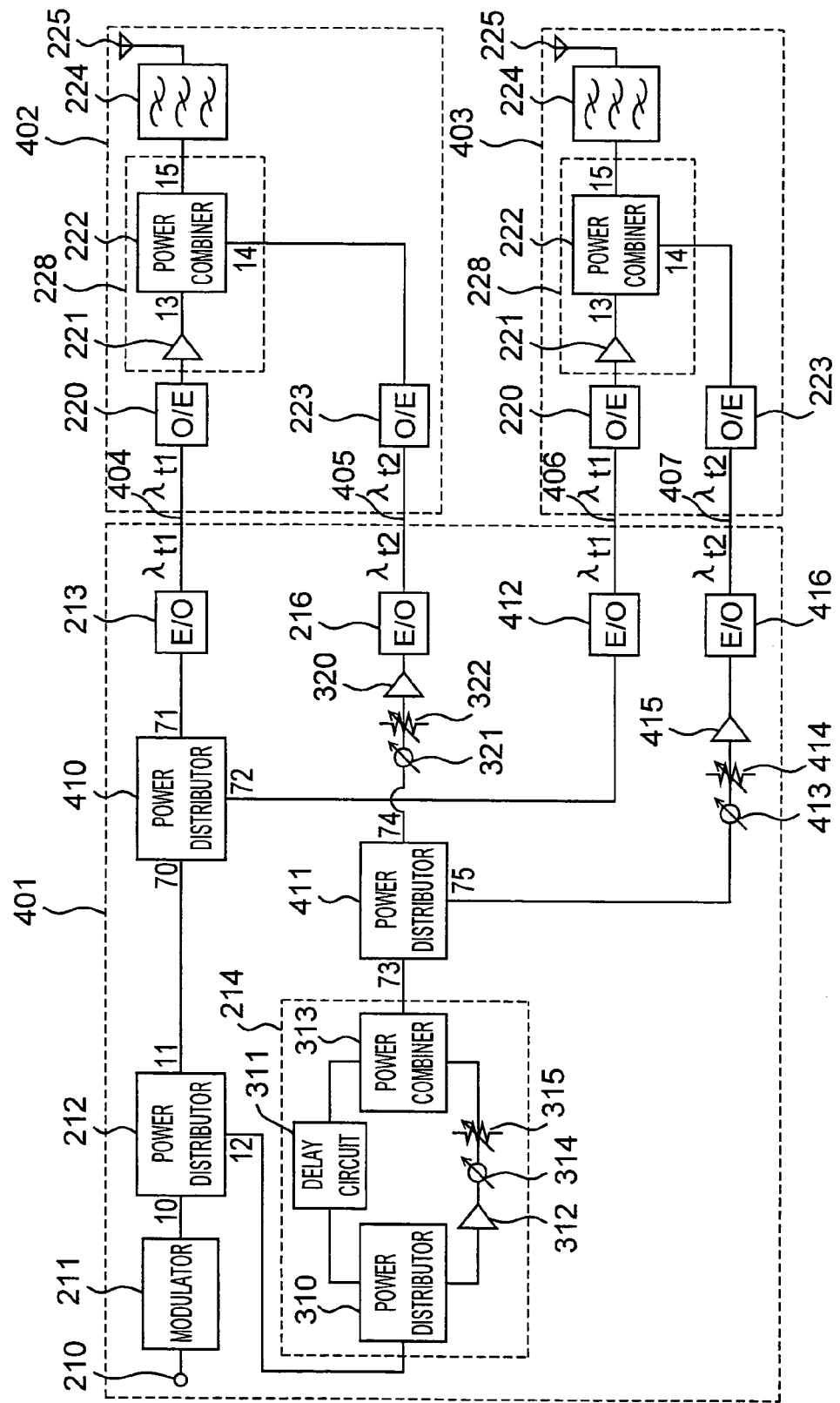
FIG. 14 is a block diagram of a wireless communication base station system including an optical forward base station according to a sixth embodiment of the present invention.

FIG. 14 is a block diagram of a wireless communication base station system according to a sixth embodiment of the present invention. As shown in FIG. 14, the wireless communication base station system includes one wireless key base station 401 and two optical forward base stations 402 and 403. They are connected to each other by optical fibers 404, 405, 406 and 407 serving as an optical transmitter.

First, the configuration of the wireless key base station 401 will be described below. The input terminal 210 for a baseband signal is connected to the modulator 211, and the output terminal of the modulator 211 is connected to the terminal 10 of the power distributor 212. The output terminal 11 of the power distributor 212 is connected to an input terminal 70 of a power distributor 410, while the other terminal 12 of the power distributor 212 is connected to the distortion extraction circuit 214. The output terminal of the distortion extraction circuit 214 is connected to an input terminal 73 of a power distributor 411. Output terminals 71 and 72 of the power distributor 410 are connected to the electrical to optical converter 213 and an electrical to optical converter 412, respectively. Output terminals 74 and 75 of the power distributor 411 are connected to the electrical to optical converter 216 and an electrical to optical converter 416 through distortion signal adjusters, respectively. The output terminals of the electrical to optical converters 213, 216, 412 and 416 are connected to the optical fibers 404, 405, 406 and 407, respectively.

The distortion signal adjuster connected to the output terminal 74 of the power distributor 411 includes the variable phase shifter 321, the variable attenuator 322, and the auxiliary amplifier 320. The distortion signal adjuster connected to the output terminal 75 of the power distributor 411 includes a variable phase shifter 413, a variable attenuator 414, and an auxiliary amplifier 416.

Next, the configurations of the optical forward base station 402 and 403 will be described below. In the optical forward base station 402, the optical fiber 404 and the optical to electrical converter 220 are connected to each other. The output terminal of the optical to electrical converter 220 and the input terminal of the power amplifier 221 are connected to each other, and the output terminal of the power amplifier 221 is connected to the terminal 13 of the power combiner 222. Meanwhile, the optical fiber 405 is connected to the optical to electrical converter 223, and the output terminal of the optical to electrical converter 223 is connected to the terminal 14 of the power combiner 222. The terminal 15 of the power combiner 222 is connected to the input terminal of the antenna duplexer 224, and the output terminal of the antenna duplexer 224 is connected to the antenna 225. The configuration of the optical forward base station 403 is the same as that of the optical forward base station 402 except that the optical fiber 406 and the optical to electrical converter 220 are connected to each other and that the optical fiber 407 and the optical to electrical converter 223 are connected to each other.

According to the system of this embodiment, the power distributor 410 to distribute one signal to two signals is placed subsequent to the power distributor 212. Thus, desired signals can be simultaneously transmitted to the two optical forward base stations 402 and 403. Also, distortion components can be simultaneously transmitted to the two optical forward base stations 402 and 403 by placing the power distributor 411 to distribute one signal to two signals subsequent to the distortion extraction circuit 214. Thus, the distortion extraction circuit 214 can be shared by the two optical forward base stations.

Moreover, the distortion signal adjuster placed between the terminal 74 of the power distributor 411 and the electrical to optical converter 216 may be included in the optical forward base station 402, and that placed between the terminal 75 of the power distributor 411 and the electrical to optical converter 416 may be included in the optical forward base station 403.

Furthermore, the system may have a configuration of extracting a transmission signal transmitted from the optical forward base station to a mobile telephone or the like or a distortion component included in the transmission signal in order to control a variable phase shifter or a variable attenuator by the transmission signal or the distortion component as shown in FIG. 7 to 9.

Furthermore, the power combiner 222 may be placed between the optical to electrical converter 220 (optical to electrical converter 223) and the power amplifier 221 in order to combine a desired signal component and a distortion component with each other before the desired signal component is input to the power amplifier 221 in each optical forward base station as shown in FIG. 11.

Furthermore, the difference between transmission times of the two signals input to the power combiner 222 in each of the optical forward base stations 402 and 403 can be compensated by installing a delay circuit in the wireless key base station 401 or each of the optical forward base stations 402 and 403, so that the two signals are simultaneously input to power combiner 222. In addition, instead of installing the delay circuit, the lengths of the optical fibers 404, 405, 406, and 407 may be adjusted to compensate the difference.

Furthermore, the wireless key base station and each optical forward base station may be connected by one optical fiber by wavelength multiplexing. In this case, each of the optical forward base stations 402 and 403 includes an optical multiplex and demultiplex device multiplex a plurality of optical signals and demultiplex an optical signal. At the same time, the wireless key base station 401 includes two optical multiplex and demultiplex devices. Thus, the first optical multiplex and demultiplex device of the wireless key base station 401 and that of the optical forward base station 402 are connected to each other with one optical fiber, and the second one of the wireless key base station 401 and that of the optical forward base station 403 are connected to each other with one optical fiber. These optical multiplex and demultiplex devices may be optical couplers.

Although two optical forward base stations are used according to the wireless communication base station system of this embodiment, N (N is a positive integer which is 2 or more) ones may be used. In this case, the power distributors 410 and 411 act as N-distributors.

It will be obvious to those having skill in the art that many changes may be made in the above-described details of the preferred embodiments of the present invention. The scope of the present invention, therefore, should be determined by the following claims.

What is claimed is:

1. A wireless communication base station system comprising:
   a wireless key base station;
   an optical forward base station; and
   an optical transmitter which connects said wireless key base station and said optical forward base station to each other;
   wherein said wireless key base station comprises:
      a modulator which modulates an input signal;
      a first distributor which distributes an input signal received from said modulator to two output signals;
      a first electrical to optical converter which converts a first output signal of the two output signals of said first distributor to an optical signal;
      a distortion extracter which extracts a distortion component from a signal obtained by amplifying a second output signal of the two output signals of said first distributor; and
      a second electrical to optical converter which converts an output signal of said distortion extracter to an optical signal;
   wherein said optical forward base station comprises:
      a first optical to electrical converter which converts the optical signal transmitted from said first electrical to optical converter through said optical transmitter to an electrical signal;
      a second optical to electrical converter which converts the optical signal transmitted from said second electrical to optical converter through said optical transmitter to an electrical signal; and
      a distortion remover which generates an amplified signal from which said distortion component is removed by using the output electrical signal of said first optical to electrical converter and the output electrical signal of said second optical to electrical converter.

2. The wireless communication base station system according to claim 1, wherein said distortion remover comprises:
   a power amplifier which amplifies the output electrical signal of said first optical to electrical converter; and
   a first combiner which combines an output signal of said power amplifier and the output electrical signal of said second optical to electrical converter.

3. The wireless communication base station system according to claim 2, further comprising a delay compensator;
   wherein said delay compensator is arranged between said first distributor and said first electrical to optical converter or between said first optical to electrical converter and said power amplifier.

4. The wireless communication base station system according to claim 1, wherein said distortion remover comprises:
   a first combiner which combines the output electrical signal of said first optical to electrical converter and the output electrical signal of said second optical to electrical converter; and
   a power amplifier which amplifies an output signal of said first combiner.

5. The wireless communication base station system according to claim 4, further comprising a delay compensator;
   wherein said delay compensator is arranged between said first distributor and said first electrical to optical converter or between said first optical to electrical converter and said first combiner.

6. The wireless communication base station system according to claim 1, wherein said distortion extracter comprises:
   a first part which extracts a distortion signal from a signal obtained by amplifying an input signal; and
   a second part which adjusts said distortion signal to output the adjusted signal as said distortion component.

7. The wireless communication base station system according to claim 6, wherein said second part is placed in an output circuit of said second optical to electrical converter.

8. The wireless communication base station system according to claim 1, wherein said optical forward base station further comprises:
   a second distributor which distributes an input signal received from said distortion remover to two output signals; and
   a third electrical to optical converter which converts a third output signal of the two output signals of said second distributor to an optical signal;
   wherein said wireless key base station further comprises:
      a third optical to electrical converter which converts the optical signal transmitted from said third electrical to optical converter through said optical transmitter to an electrical signal; and
      a detection and control device which detects the output electrical signal of said third optical to electrical converter to control said distortion extracter.

9. The wireless communication base station system according to claim 8, wherein said wireless key base station further comprises:
   a third distributor which distributes said first output signal of said first distributor to two output signals; and
   a second combiner which combines the output electrical signal of said third optical to electrical converter and a fourth output signal of the two output signals of said third distributor;
   wherein said first electrical to optical converter converts a fifth output signal of the two output signals of said third distributor to an optical signal; and
   said detection and control device detects an output signal of said second combiner to control said distortion extracter.

10. The wireless communication base station system according to claim 8, wherein
    said wireless key base station further comprises a second combiner;
    said first distributor further comprises a first output terminal and distributes the input signal received from said modulator to three output signals to output one of the three output signals to said first output terminal; said first output terminal is connected to said second combiner;
    said second combiner combines the output electrical signal of said third optical to electrical converter and the output signal from said first output terminal; and
    said detection and control device detects an output signal of said second combiner to control said distortion extracter.

11. The wireless communication base station system according to claim 1,
    wherein said optical forward base station further comprises an antenna duplexer comprising:
       a second terminal to which a signal to be transmitted from said optical forward base station is input;
       a third terminal connected to an antenna; a fourth terminal connected to a third low-noise amplifier which amplifies a signal received by said antenna; and
       a fourth electrical to optical converter which is connected to an output terminal of said third low-noise amplifier and converts an output signal of said third low-noise amplifier to an optical signal;
    wherein said wireless key base station further comprises:
       a fourth optical to electrical converter which converts the optical signal transmitted from said fourth electrical to optical converter through said optical transmitter to an electrical signal; and
       a demodulator which demodulates the output electrical signal of said fourth optical to electrical converter.

12. The wireless communication base station system according to claim 1, wherein said optical transmitter comprises a plurality of optical fibers, each of which directly connects one of the electrical to optical converters and one of the optical to electrical converters.

13. The wireless communication base station system according to claim 12, wherein at least one of said plurality of optical fibers has a length different from the length(s) of the other(s).

14. The wireless communication base station system according to claim 1, wherein said optical transmitter comprises:
    a first optical multiplex and demultiplex device connected to said wireless key base station to multiplex a plurality of optical signals and demultiplex one optical signal;
    a second optical multiplex and demultiplex device connected to said optical forward base station to multiplex a plurality of optical signals and demultiplex one optical signal; and
    an optical fiber which connects said first and second optical multiplex and demultiplex devices to each other.

15. A wireless communication base station system comprising: a wireless key base station;
    an optical forward base station; and
    an optical transmitter which connects said wireless key base station and said optical forward base station to each other;
    wherein said wireless key base station comprises:
       a modulator which modulates an input signal;
       a first distributor which distributes an input signal received from said modulator to two output signals;
       a first electrical to optical converter which converts a first output signal of the two output signals of said first distributor to an optical signal;
       a first power amplifier which amplifies a second output signal of the two output signals of said first distributor;
       a first adjuster which adjusts an output signal of said first power amplifier; and a second electrical to optical converter which converts an output signal of said first adjuster to an optical signal;
    wherein said optical forward base station comprises:
       a first optical to electrical converter which converts the optical signal transmitted from said first electrical to optical converter through said optical transmitter to an electrical signal;
       a second optical to electrical converter which converts the optical signal transmitted from said second electrical to optical converter through said optical transmitter to an electrical signal;

a second distributor which distributes the electrical signal received from said first optical to electrical converter to two output signals;

a first combiner which combines a third output signal of the two output signals of said second distributor and the output electrical signal of said second optical to electrical converter;

a second adjuster which adjusts an output signal of said first combiner to output the adjusted signal as a distortion component; and a distortion remover which generates an amplified signal from which said distortion component is removed by using a fourth output signal of the two output signals of said second distributor and an output signal of said second adjuster.

16. The wireless communication base station system according to claim 15, wherein said distortion remover comprises:

a second power amplifier which amplifies said fourth output signal of said second distributor; and a second combiner which combines an output signal of said second power amplifier and the output signal of said second adjuster.

17. The wireless communication base station system according to claim 15, wherein said distortion remover comprises:

a second combiner which combines said fourth output signal of said second distributor and the output signal of said second adjuster; and a second power amplifier which amplifies an output signal of said second combiner.

18. The wireless communication base station system according to claim 15, wherein said optical forward base station further comprises:

a third distributor which distributes an input signal received from said distortion remover to two output signals; and a third electrical to optical converter which converts a fifth output signal of the two output signals of said third distributor to an optical signal;

wherein said wireless key base station further comprises:

a third optical to electrical converter which converts the optical signal transmitted from said third electrical to optical converter through said optical transmitter to an electrical signal; and a detection and control device which detects the output electrical signal of said third optical to electrical converter to control said first adjuster.

19. The wireless communication base station system according to claim 18, wherein said wireless key base station further comprises:

a fourth distributor which distributes said first output signal of said first distributor to two output signals; and a third combiner which combines the output electrical signal of said third optical to electrical converter and a sixth output signal of the two output signals of said fourth distributor;

wherein said first electrical to optical converter converts a seventh output signal of the two output signals of said fourth distributor to an optical signal; and said detection and control device detects an output signal of said third combiner to control said first adjuster.

20. The wireless communication base station system according to claim 18, wherein said wireless key base station further comprises a third combiner;

said first distributor further comprises a first output terminal and distributes the input signal received from said modulator to three output signals to output one of the three output signals to said first output terminal;

said first output terminal is connected to said third combiner;

said third combiner combines the output electrical signal of said third optical to electrical converter and the output signal from said first output terminal; and said detection and control device detects an output signal of said third combiner to control said first adjuster.

21. The wireless communication base station system according to claim 15, wherein said optical forward base station further comprises:

an antenna duplexer comprising:

a second terminal to which a signal to be transmitted from said optical forward base station is input;

a third terminal connected to an antenna;

a fourth terminal connected to a third low-noise amplifier which amplifies a signal received by said antenna; and a fourth electrical to optical converter which is connected to an output terminal of said third low-noise amplifier and converts an output signal of said third low-noise amplifier to an optical signal;

wherein said wireless key base station further comprises:

a fourth optical to electrical converter which converts the optical signal transmitted from said fourth electrical to optical converter through said optical transmitter to an electrical signal; and a demodulator which demodulates the output electrical signal of said fourth optical to electrical converter.

22. The wireless communication base station system according to claim 15, wherein said optical transmitter comprises a plurality of optical fibers, each of which connects one of the electrical to optical converters and one of the optical to electrical converters.

23. The wireless communication base station system according to claim 22, wherein at least one of said plurality of optical fibers has a length different from a length of another of the plurality of optical fibers.

24. A wireless communication base station system comprising:

one wireless key base station;

N optical forward base stations where N is a positive integer of 2 or more; and an optical transmitter which connects said wireless key base station and said optical forward base stations;

wherein said wireless key base station comprises:

a modulator which modulates an input signal;

a first distributor which distributes an input signal received from said modulator to two output signals;

a second distributor which distributes a first output signal of the two output signals of said first distributor to N output signals;

a distortion extracter which extracts a distortion component from a signal obtained by amplifying a second output signal of the two output signals of said first distributor; a third distributor which distributes an output signal of said distortion extracter to N output signals;

N first electrical to optical converters each of which converts one of said N output signals of said second distributor to an optical signal; and N second electrical to optical converters each of which converts one of said N output signals of said third distributor to an optical signals; and each of said N optical forward base stations comprises:

a first optical to electrical converter which converts the optical signal transmitted from one of said N first electrical to optical converters through said optical transmitter to an electrical signal;

a second optical to electrical converter which converts the optical signal transmitted from one of said N second electrical to optical converters through said optical transmitter to an electrical signal; and a distortion remover which generates an amplified signal from which said distortion component is removed by using the output electrical signal of said first optical to electrical converter and the output electrical signal of said second optical to electrical converter.

25. The wireless communication base station system according to claim 24, wherein said distortion remover comprises:

a power amplifier which amplifies the output electrical signal of said first optical to electrical converter; and a combiner which combines an output signal of said power amplifier and the output electrical signal of said second optical to electrical converter.

26. The wireless communication base station system according to claim 24, wherein said distortion remover comprises:

a combiner which combines the output electrical signal of said first optical to electrical converter and the output electrical signal of said second optical to electrical converter; and a power amplifier which amplifies an output signal of said combiner.

27. The wireless communication base station system according to claim 24, wherein said optical transmitter comprises a plurality of optical fibers, each of which connects one of the electrical to optical converters and one of the optical to electrical converters.

28. The wireless communication base station system according to claim 27, wherein at least one of said plurality of optical fibers has a length different from a length of another of the plurality of optical fibers.

* * * * *

UNITED STATES PATENT AND TRADEMARK OFFICE
CERTIFICATE OF CORRECTION

| | | |
|---|---|---|
| PATENT NO. | : 6,980,831 B2 | Page 1 of 1 |
| APPLICATION NO. | : 10/432356 | |
| DATED | : December 27, 2005 | |
| INVENTOR(S) | : T. Matsuyoshi et al. | |

It is certified that error appears in the above-identified patent and that said Letters Patent is hereby corrected as shown below:

On the cover of the printed patent, at Item (54), Title, "RADIO COMMUNICATION BASE STATE SYSTEM INCLUDING OPTICAL ADVANCED BASE STATION" should be ---WIRELESS COMMUNICATION BASE STATION SYSTEM INCLUDING AN OPTICAL FORWARD BASE STATION---.

On the cover page, at Item (57), Abstract, line 16, "include" should be ---included---.

Signed and Sealed this

Twenty-second Day of August, 2006

JON W. DUDAS
*Director of the United States Patent and Trademark Office*